(12) United States Patent
Pham et al.

(10) Patent No.: US 11,536,024 B2
(45) Date of Patent: Dec. 27, 2022

(54) MULTI-LAYER ACOUSTICAL BUILDING PANELS

(71) Applicant: ARMSTRONG WORLD INDUSTRIES, INC., Lancaster, PA (US)

(72) Inventors: Phi-Oanh R. Pham, Lancaster, PA (US); Sean D. Browne, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 258 days.

(21) Appl. No.: 16/844,285

(22) Filed: Apr. 9, 2020

(65) Prior Publication Data

US 2020/0325680 A1    Oct. 15, 2020

Related U.S. Application Data

(60) Provisional application No. 62/832,793, filed on Apr. 11, 2019.

(51) Int. Cl.
*E04B 9/04* (2006.01)
*E04B 1/86* (2006.01)
(Continued)

(52) U.S. Cl.
CPC ............... *E04B 9/045* (2013.01); *B32B 5/02* (2013.01); *B32B 5/26* (2013.01); *B32B 7/12* (2013.01);
(Continued)

(58) Field of Classification Search
CPC .... E04B 1/86; E04B 9/045; E04B 2001/8466; E04B 2001/8461; E04B 9/001;
(Continued)

(56) References Cited

U.S. PATENT DOCUMENTS 5,071,511 A    12/1991  Pittman
5,558,710 A     9/1996  Baig
(Continued)

FOREIGN PATENT DOCUMENTS

| DE | 202016003731 U1 * | 8/2016 | |
| EP | 1391443 A2 | 2/2004 | |
| WO | WO-2010103322 A2 * | 9/2010 | ............. B32B 13/02 |

*Primary Examiner* — Theodore V Adamos
(74) *Attorney, Agent, or Firm* — Craig M. Sterner

(57) ABSTRACT

The present invention is directed to an acoustic ceiling panel having a first major exposed surface opposite a second major exposed surface, the acoustic ceiling panel comprising: a first layer having an upper surface opposite a lower surface, the first layer comprising: a first body comprising a first major surface opposite a second major surface and a side surface extending between the first and second major surfaces, the first body being air-permeable; and a first attenuation coating applied to the first body; a second layer having an upper surface opposite a lower surface, the second layer comprising: a second body comprising a first major surface opposite a second major surface and a side surface extending between the first and second major surfaces, the second body being air-permeable; and a second attenuation coating applied to the second body; and an adhesive present between the first and second layers.

20 Claims, 12 Drawing Sheets

(51) Int. Cl.
  *B32B 7/12* (2006.01)
  *B32B 5/02* (2006.01)
  *B32B 5/26* (2006.01)
  *E04B 1/84* (2006.01)

(52) U.S. Cl.
  CPC ............ *E04B 1/86* (2013.01); *B32B 2255/02* (2013.01); *B32B 2307/10* (2013.01); *B32B 2419/04* (2013.01); *E04B 2001/8461* (2013.01)

(58) Field of Classification Search
  CPC .... B32B 5/02; B32B 5/26; B32B 7/12; B32B 2307/10; B32B 2419/04; B32B 2255/02
  See application file for complete search history.

(56) References Cited

U.S. PATENT DOCUMENTS

| | | | |
|---|---|---|---|
| 5,905,234 A | 5/1999 | Tsukamoto et al. | |
| 5,911,818 A | 6/1999 | Baig | |
| 5,964,934 A | 10/1999 | Englert | |
| 6,443,256 B1 | 9/2002 | Baig | |
| 6,855,753 B1 | 2/2005 | Englert | |
| 7,798,287 B1 * | 9/2010 | Surace | E04B 9/0435 |
| | | | 181/290 |
| 7,862,687 B2 | 1/2011 | Englert et al. | |
| 8,182,922 B2 | 5/2012 | Baig et al. | |
| 9,238,912 B1 * | 1/2016 | Pham | E04B 1/8409 |
| 9,390,700 B1 * | 7/2016 | Pham | E04B 1/86 |
| 9,702,142 B1 * | 7/2017 | Wang | E04B 1/86 |
| 2004/0209071 A1 | 10/2004 | Carbo et al. | |
| 2005/0284065 A1 * | 12/2005 | Shaffer | E04B 1/7662 |
| | | | 52/404.1 |
| 2018/0079691 A1 * | 3/2018 | Donelan | E04B 9/045 |

* cited by examiner

MULTI-LAYER ACOUSTICAL BUILDING PANELS

CROSS-REFERENCE TO RELATED APPLICATIONS

This application claims the benefit of U.S. Provisional Application No. 62/832,793, filed on Apr. 11, 2019. The disclosure of the above application is incorporated herein by reference.

FIELD OF INVENTION

Embodiments of the present invention relate to acoustic building panels having noise reducing and high sound attenuation characteristics.

BACKGROUND

Various types of ceiling systems have been used in commercial and residential building construction to provide the desired acoustical performance. Noise blocking between rooms is required for a variety of purposes, including speech privacy as well as not bothering the occupants of adjacent rooms. Sound dampening within a single room is also required for a variety of purposes, including decreasing volume levels within a single space.

Previous attempts have been made to improve noise blocking between adjacent rooms. However, such previous attempts either lack noise reducing performance or are limited by the maximum sound attenuation that can be achieved. Thus, there is a need for a new acoustic building panel exhibiting the desired enhanced acoustical properties.

SUMMARY

According to some embodiments, the present invention is directed to an acoustic ceiling panel having a first major exposed surface opposite a second major exposed surface, the acoustic ceiling panel comprising: a first layer having an upper surface opposite a lower surface, the first layer comprising: a first body comprising a first major surface opposite a second major surface and a side surface extending between the first and second major surfaces, the first body being air-permeable; and a first attenuation coating applied to the first body; a second layer having an upper surface opposite a lower surface, the second layer comprising: a second body comprising a first major surface opposite a second major surface and a side surface extending between the first and second major surfaces, the second body being air-permeable; and a second attenuation coating applied to the second body; and an adhesive present between the first and second layers.

Other embodiments of the present invention include an acoustic ceiling panel having a first major exposed surface opposite a second major exposed surface, the acoustic ceiling panel comprising: a first layer having an upper surface opposite a lower surface, the first layer comprising: a first body comprising a first major surface opposite a second major surface and a side surface extending between the first and second major surfaces; and a first coating applied to the first major surface and the side surface of the first body; a second layer having an upper surface opposite a lower surface, the second layer comprising: a second body comprising a first major surface opposite a second major surface and a side surface extending between the first and second major surfaces; and a second coating applied to first major surface and the side surface of the second body.

Other embodiments of the present invention include an acoustic ceiling panel having a first major exposed surface opposite a second major exposed surface and an exposed side surface extending there-between, the acoustic ceiling panel comprising: a first layer having an upper surface opposite a lower surface, the first layer comprising: a first body comprising a first major surface opposite a second major surface and a side surface extending between the first and second major surfaces; and a first coating applied to the first major surface and the side surface of the first body; a second layer having an upper surface opposite a lower surface, the second layer comprising: a second body comprising a first major surface opposite a second major surface and a side surface extending between the first and second major surfaces; and a second coating applied to first major surface of the second body; wherein the exposed side surface of the acoustic ceiling panel comprises the first coating and the side surface of the second body.

Other embodiments of the present invention include a ceiling system comprising: a ceiling grid comprising a plurality of first members and a plurality of second members, the first and second members intersecting one another to define a plurality of grid openings; a plenary space above the ceiling grid; a room environment below the ceiling grid; and at least one of the previously described the acoustical ceiling panels mounted to the ceiling grid and positioned within the grid opening; wherein the first major surface of the first air-permeable body faces the room environment.

Other embodiments of the present invention include a method of forming an acoustic ceiling panel comprising: a) providing a first layer comprising a first attenuation coating applied to a first air-permeable body and providing a second layer comprising a second attenuation coating applied to a second air-permeable body; b) applying an adhesive to at least one of the first layer and second layer; and c) joining the first layer and the second layer together, whereby the adhesive is between the first layer and the second layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments of the present invention will be described with reference to the following drawings, where like elements are labeled similarly, and in which.

Figure 1:
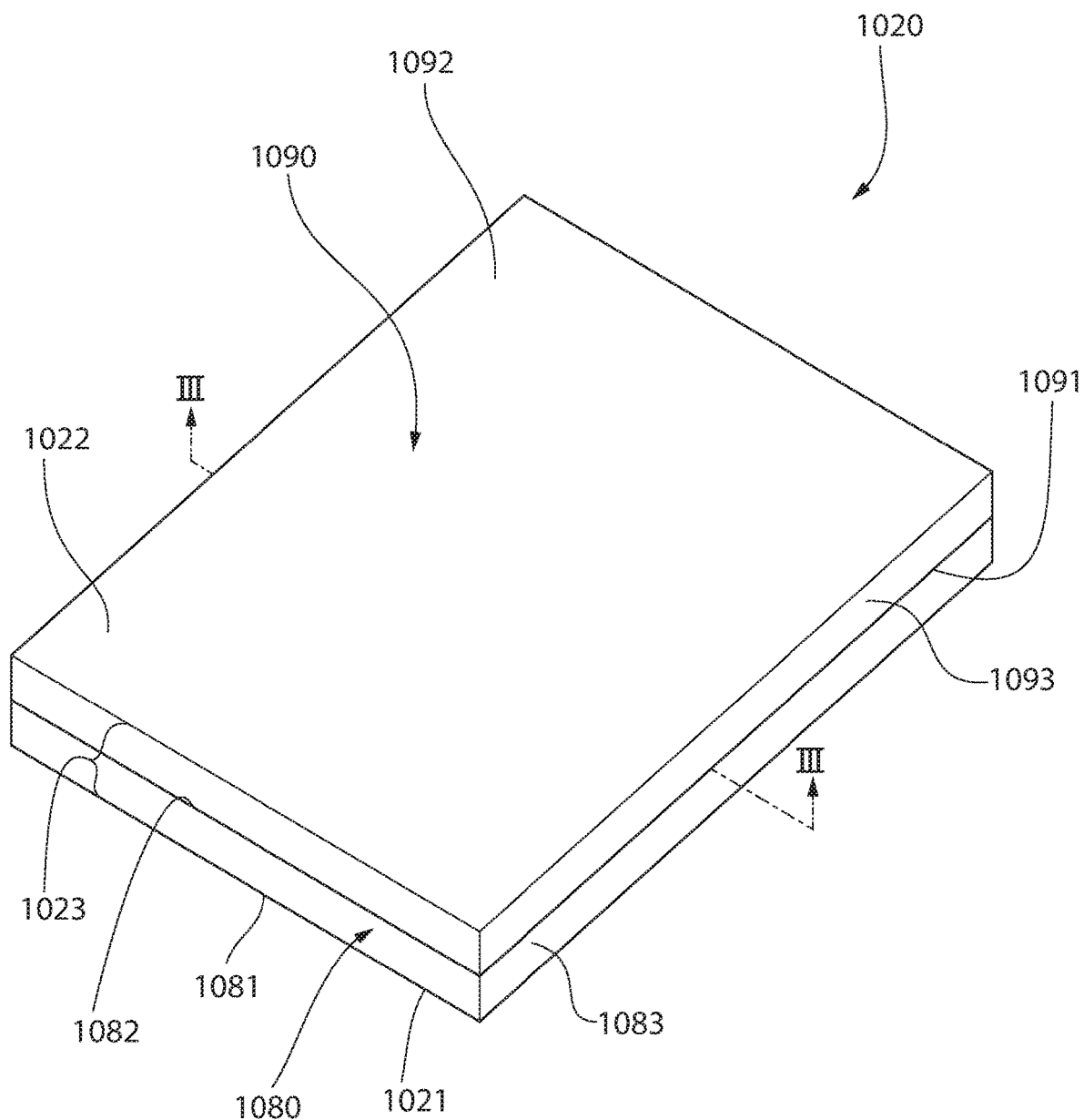
FIG. 1 is a perspective view of an acoustic building panel according to an embodiment of the present invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

Figure 4:
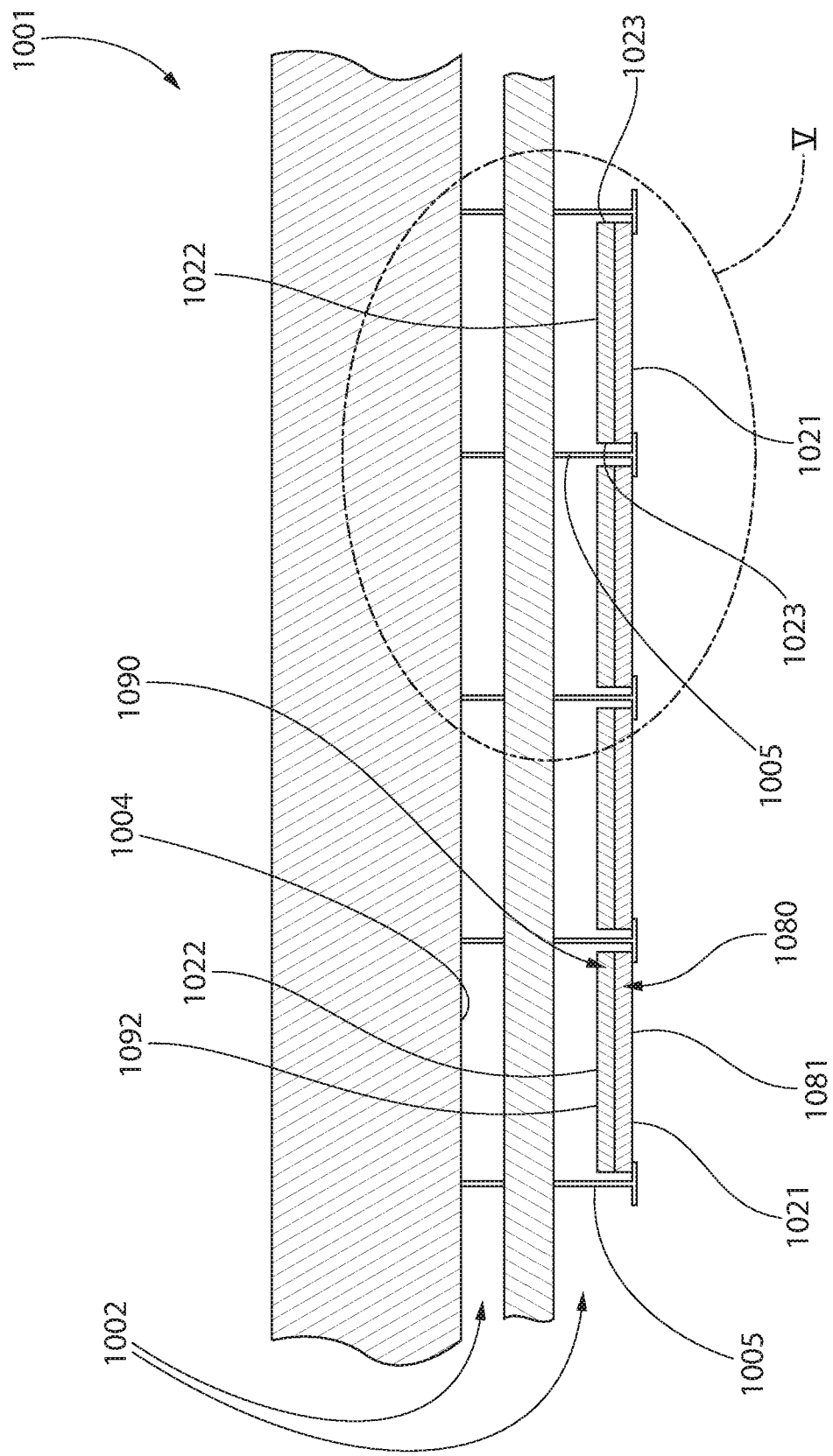
FIG. 4 is a side view of building system comprising a plurality of the acoustic building panels of FIG. 1 according to the present invention.
Figure 5:
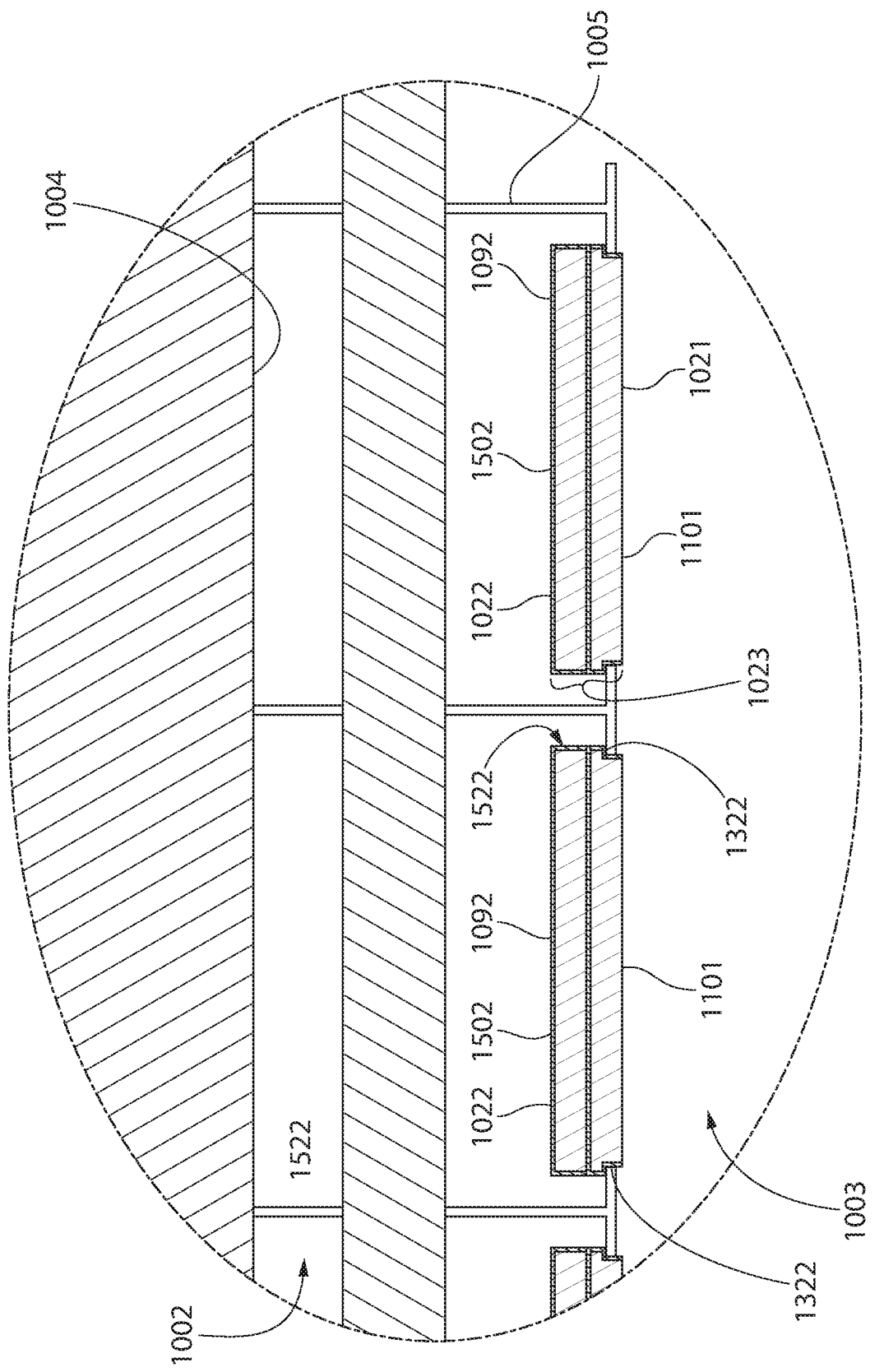
FIG. 5 is a close-up cross-sectional view of region V of the building system of FIG. 4.
Figure 6:
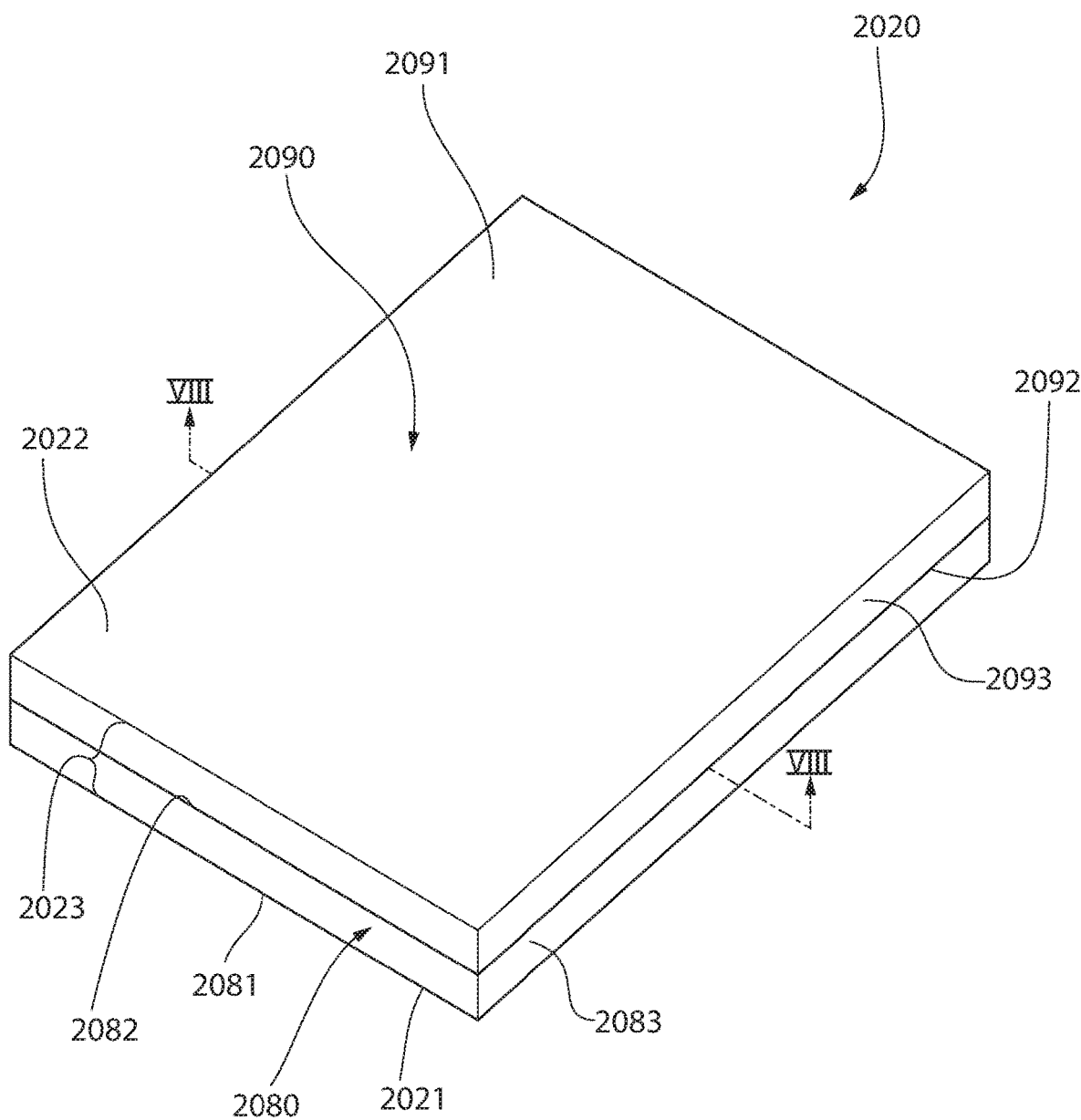
FIG. 6 is a perspective view of an acoustic building panel according to another embodiment of the present invention.
Figure 7:
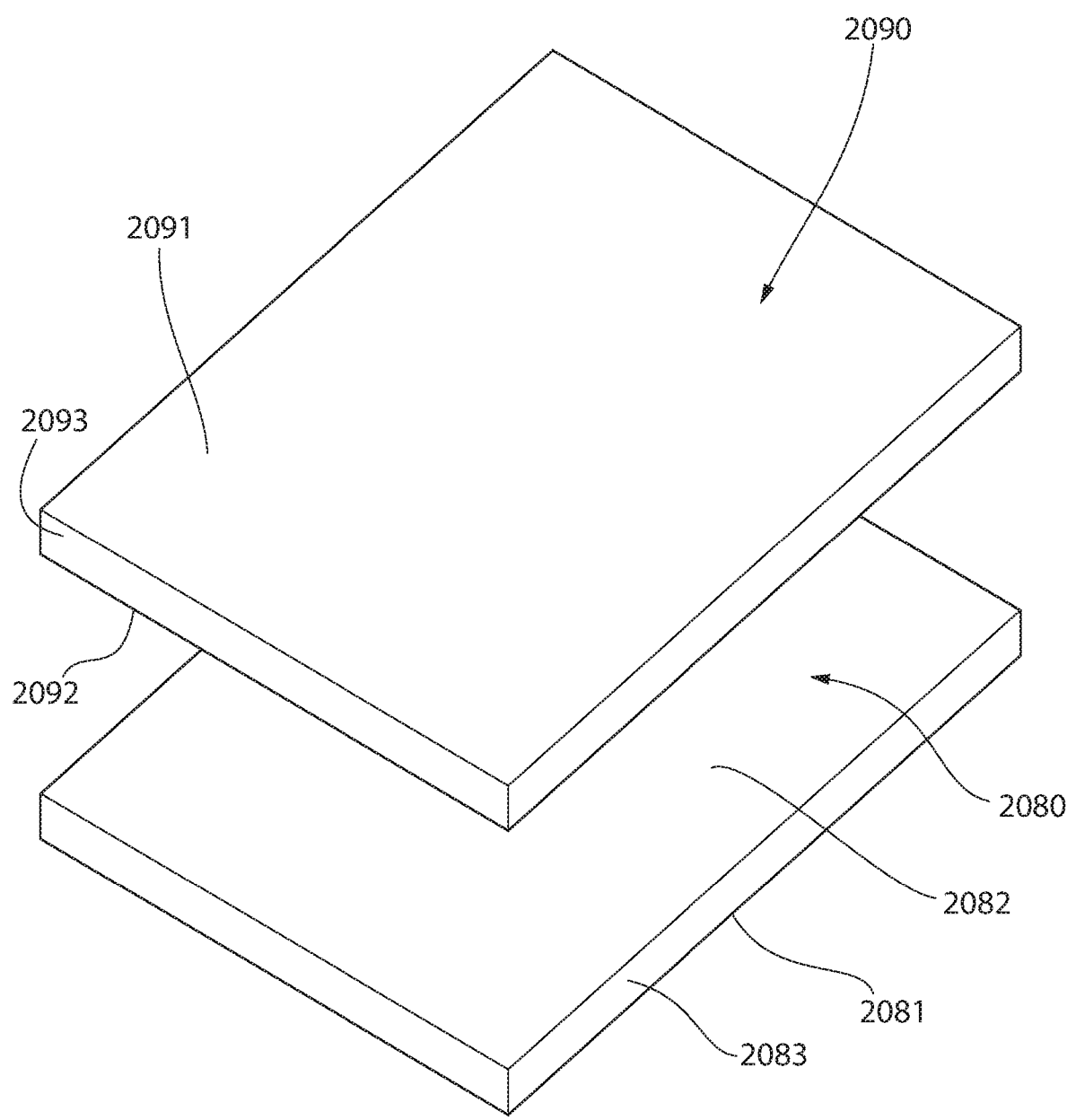
FIG. 7 is an exploded perspective view of the acoustic building panel of FIG. 6.

As shown in FIGS. 4 and 5, the present invention is directed to a ceiling system 1001 comprising a support grid 1005 and at least one acoustic building panel 1020. A plenary space 1002 may exist above the support grid 1005. The plenary space 1002 is the space that exists above the acoustic building panels 1020 and above the support grid 1005 and below a roof or a subfloor 1004 of an above adjacent floor in a building. The plenary space 1002 provides room for mechanical lines to be run throughout a building—e.g. HVAC, plumbing, data lines, etc. A room environment 1003 may exist below the acoustic building panels 1020 and below the support grid 1005. The room environment 1003 is the space occupied by inhabitants of a room—e.g. room environments 1003 in an office building would be the space occupied by desks, office workers, computers, etc. The combination of the support grid 1005 and the acoustic building panels 1020 may act as an acoustic, thermal, and aesthetic barrier between the room environment 1003 and the plenary space 1002, as well as a sound deadening layer for noise that exists within the room environment 1003, as discussed herein.

The support grid 1005 may comprise a plurality of first struts extending parallel to each other. In some embodiments, the support grid 1005 may further comprise a plurality of second struts that extend parallel to each other (not pictured). The plurality of first struts may intersect the plurality of second struts to form a grid pattern having a plurality of grid openings. In some embodiments, the plurality of first struts intersects the plurality of second struts at a substantially perpendicular angle, thereby forming rectangular grid openings. The rectangular grid openings may be square or any other shape that is aesthetical or functional.

Each of the plurality of first struts and each of the plurality of second struts may comprises T-bars having a horizontal flange and a web. The plenary space 1002 exists above the T-bars and the room environment 1003 exists below the T-bars.

The ceiling system 1001 of the present disclosure comprises at least one acoustic building panel 1020 that is mounted within of the grid openings of the support grid. The ceiling system 1001 may comprises a plurality of acoustic building panels 1020 mounted to the support grid 1005, each of the plurality of acoustic building panels 1020 resting within one of the plurality of grid openings. In some embodiments, something other than the acoustic building panel 1020 (for example, light fixture or an air duct vent) may be mounted to the support grid 1005 within at least one of the grid openings (not pictured).

Figure 2:
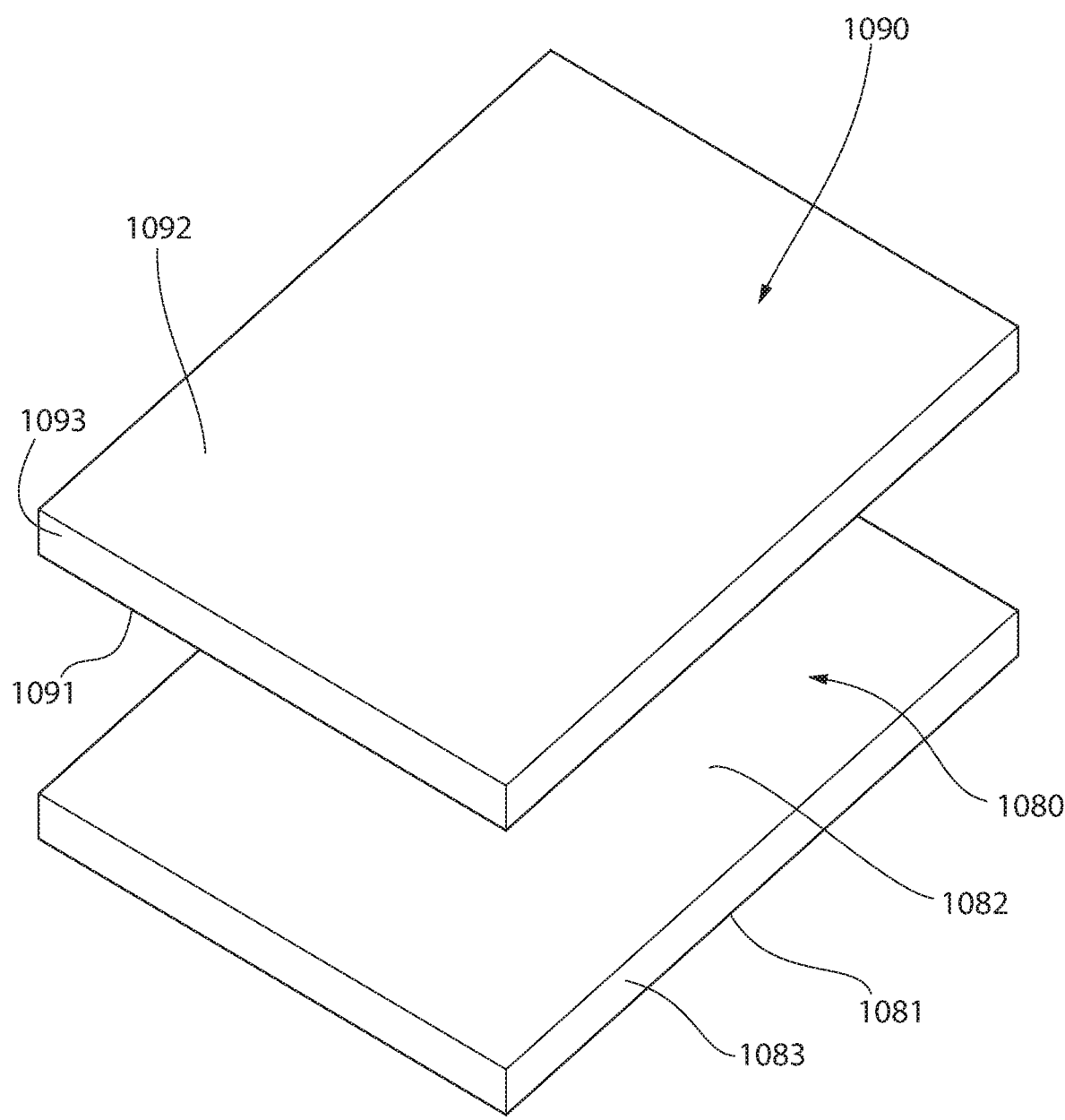
FIG. 2 is an exploded perspective view of the acoustic building panel of FIG. 1.

Referring now to FIGS. 1 and 2, the acoustic building panel 1020 may comprise a first exposed major surface 1021 (also referred to as an "upper exposed major surface") opposite a second major exposed surface 1022 (also referred to a "lower exposed major surface") and an exposed side surface 1023 extending between the first and second exposed major surfaces 1021, 1022. The first exposed major surface 1021 may face the active room environment 1003 and the second major surface 1022 may face the plenary space 1002.

The acoustic building panel 1020 may have an overall length and width. In some embodiments, the length of the acoustic building panel 20 may range from 12 inches to 96 inches—including all lengths and sub-ranges there-between. In a non-limiting example, the length of the acoustic building panel may be 12, 18, 24, 30, 48, 60, 72, or 96 inches. In some embodiments, the width of the acoustic building panel 1020 may range from 4 to 48 inches—including all widths and sub-ranges there-between. In a non-limiting example, the acoustic building panel 1020 may have a width of 4, 6, 12, 18, 20, 24, 30, or 48 inches.

Figure 3:
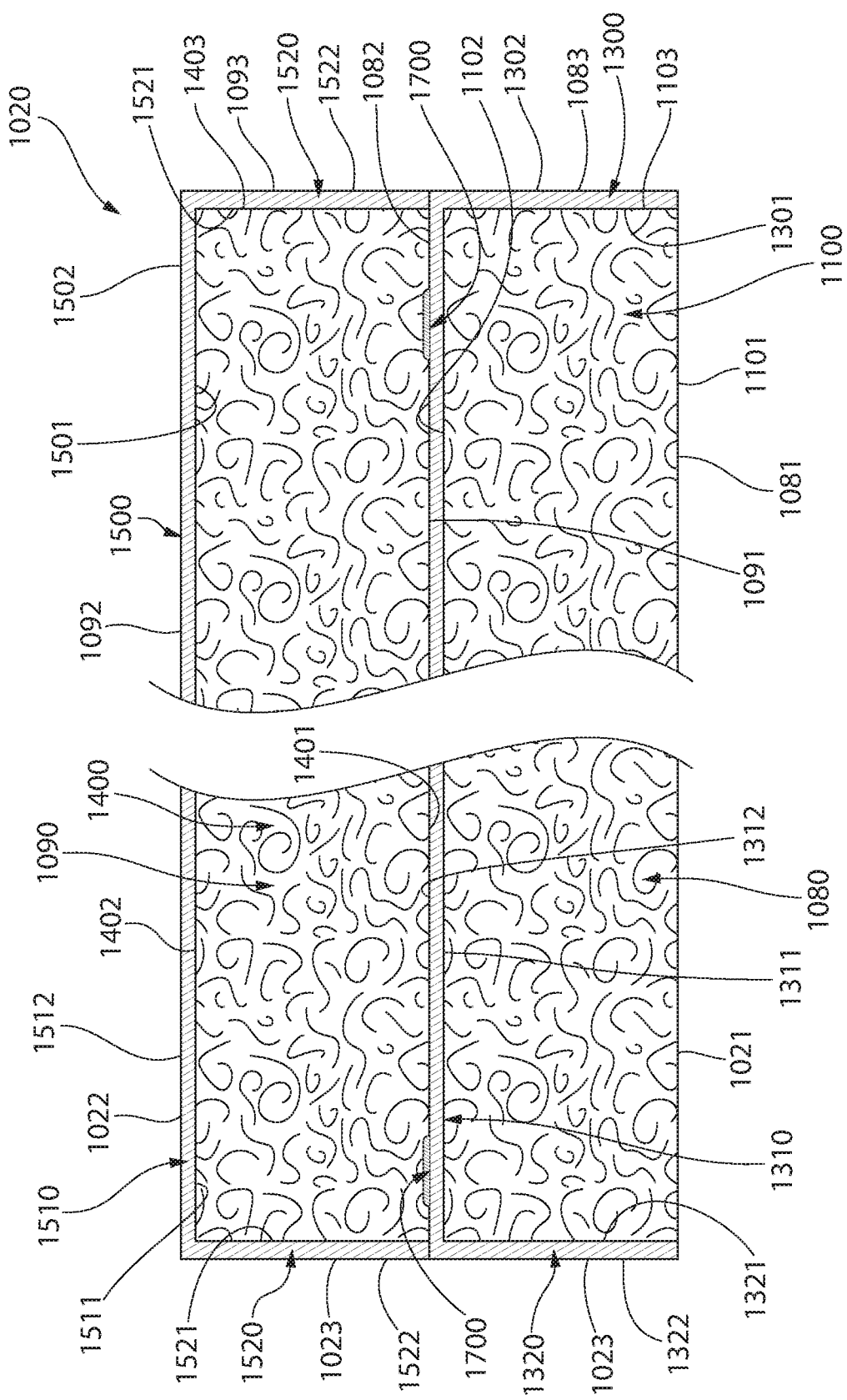
FIG. 3 is a cross-sectional view of the acoustic building panel along line III-III of FIG. 1.

As demonstrated by FIGS. 1-3, the acoustic building panel 1020 may comprise a first layer 1080 and a second layer 1090. In some embodiments of the present invention, the acoustic building panel 1020 may further comprise a scrim (not pictured).

The first layer 1080 may comprise a first air-permeable body 1100 and a first coating 1300 applied thereto. The first coating 1300 can be a first sound attenuation coating 1300 (also referred to as a "first attenuation coating"). The second layer 1090 may comprise a second air-permeable body 1400 and a second coating 1500 applied thereto. The second coating 1500 can be a second sound attenuation coating 1500 (also referred to as a "second attenuation coating"). The first layer 1080, being formed from the combination of the first air-permeable body 1100 and the attenuation coating 1300, may be referenced as the coated first body 1080. The second layer 1090, being formed from the combination of the second air-permeable body 1400 and the second attenuation coating 1500, may be referenced as the coated second body 1090.

The first air-permeable body 1100 of the first layer 1080 may comprise a first major surface 1101 (also referred to a "lower major surface") that is opposite a second major surface 1102 (also referred to as an upper major surface 102) as well as side surfaces 1103 that extends between the first and second major surfaces 1101, 1102 of first air-permeable body 1100. The first air-permeable body 1100 may have an overall length and width. The length of the first air-permeable body 1100 may be substantially equal to the length of the acoustic building panel 1020. The width of the first air-permeable body 1100 may be substantially equal to the width of the acoustic building panel 1020.

The first air-permeable body 1100 may have a first thickness as measured by the distance between the first and second major surfaces 1101, 1102 of the first air-permeable body 1100. The first thickness may range from about 0.25 inches to about 3.0 inches—including all thickness and sub-ranges there-between.

According to some embodiments, the first major surface 1101 of the first air-permeable body 1100 may have a first length and a first width and the second major surface 1102 of the first air-permeable body 1100 may have a second length and a second width. According to some embodiments, the first width of the first major surface 1101 may be substantially equal to the second width of the second major surface 1102. According to some embodiments, the first length of the first major surface 1101 may be substantially equal to the second length of the second major surface 1102. In other embodiments, the first width of the first major surface 1101 may be less than the second width of the second major surface 1102. According to some embodiments, the first length of the first major surface 1101 may be less than the second length of the second major surface 1102.

The side surface 1103 of the first air-permeable body 1100 may comprise a stepped profile having an upper side surface and a lower side surface, and an intermediate surface that may extend between the lower side surface and the upper side surface in a direction that is substantially perpendicular to the side surface 1103, the upper side surface, and the lower side surface of the first air-permeable body 1100. In some embodiments, the intermediate surface may face the same direction as the lower major surface 1101 of the first air-permeable body 1100. In other embodiments, the intermediate surface may face a direction oblique to the lower major surface 1101 of the first air-permeable body 1100.

In some embodiments, the stepped profile of the first air-permeable body 1100 may be present on each of the side surfaces 1103 of the first air-permeable body 1100. In other embodiments, the stepped profile may only be present on two opposite side surfaces 1103 of the first air-permeable body 1100.

The first air-permeable body 1100 may be a porous structure. The term "porous structure" refers to the first air-permeable body 1100 comprising a plurality of open pathways that extend between a plurality of first openings present on the first major surface 1101, a plurality of second openings present on the second major surface 1102, and a plurality of third openings present on the side surfaces 1103 of the first air-permeable body 1100. The open pathways may extend directly or indirectly between the plurality of first openings and the plurality of second openings. The open pathways may extend directly or indirectly between the plurality of third openings and plurality of second openings. The open pathways may extend directly or indirectly between the plurality of first openings and the plurality of third openings.

As discussed further herein, the open pathways may be open voids within the first air-permeable body 1100 that allow for airflow through and between the first major surface 1101, the second major surface 1102, and/or the third major surface 1103, as well as within the first air-permeable body 1100. The open pathways may be considered to create fluid communication between various points within the first air-permeable body 1100.

The first air-permeable body 1100 may comprise a fibrous material. The first air-permeable body 1100 may comprise a filler. The first air-permeable body 1100 may comprise a binder.

The fibrous material may comprise an organic fiber. The fibrous material may comprise an inorganic fiber. Non-limiting examples of inorganic fiber include fiberglass, mineral wool (also referred to as slag wool), rock wool, stone wool, and glass fibers (fiberglass). Non-limiting examples of organic fiber include cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof. Depending on the specific type of material, the fibers 130 may either be hydrophilic (e.g., cellulosic fibers) or hydrophobic (e.g. fiberglass, mineral wool, rock wool, stone wool). The fibrous material may be present in an amount ranging from about 5 wt. % to about 99 wt. % based on the total dry weight of the first air-permeable body 1100—including all values and sub-ranges there-between.

The phrase "dry-weight" refers to the weight of a referenced component without the weight of any carrier. Thus, when calculating the weight percentages of components in the dry-state, the calculation should be based solely on the solid components (e.g., binder, filler, fibrous material, etc.)

and should exclude any amount of residual carrier (e.g., water, VOC solvent) that may still be present from a wet-state, which will be discussed further herein. According to the present invention, the phrase "dry-state" may also be used to indicate a component that is substantially free of a carrier, as compared to the term "wet-state," which refers to that component still containing various amounts of carrier—as discussed further herein.

Non-limiting examples of binder may include a starch-based polymer, polyvinyl alcohol (PVOH), a latex, polysaccharide polymers, cellulosic polymers, protein solution polymers, an acrylic polymer, polymaleic anhydride, polyvinyl acetate, epoxy resins, or a combination of two or more thereof. The binder may be present in an amount ranging from about 1.0 wt. % to about 25.0 wt. % based on the total dry weight of the first air-permeable body 1100—including all percentages and sub-ranges there-between. In a preferred embodiment, the binder may be present in an amount ranging from about 3.0 wt. % to about 10.0 wt. % based on the total dry weight of the first air-permeable body 1100—including all percentages and sub-ranges there-between.

Non-limiting examples of filler may include powders of calcium carbonate, including limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate. The filler may be present in an amount ranging from about 0 wt. % to about 80 wt. % based on the total dry weight of the first air-permeable body 1100—including all values and sub-ranges there-between. In other embodiments, the filler may be present in an amount ranging from about 5 wt. % to about 70 wt. % based on the total dry weight of the first air-permeable body 1100—including all values and sub-ranges there-between.

In non-limiting embodiments, the first air-permeable body 1100 may further comprise one or more additives include defoamers, wetting agents, biocides, dispersing agents, flame retardants (such as alumina tri-hydrate), and the like. The additive may be present in an amount ranging from about 0.01 wt. % to about 30 wt. % based on the total dry weight of the first air-permeable body 1100—including all values and sub-ranges there-between.

The first air-permeable body 1100 may have a first density ranging from about 2 lb/ft$^3$ to about 16 lb/ft$^3$—including all densities and sub-ranges there-between. The first air-permeable body 1100 may have a first rigidity. In a preferred, embodiment the first air-permeable body 1100 may have a first density ranging from about 5 lb/ft$^3$ to about 14 lb/ft$^3$—including all densities and sub-ranges there-between. The first air-permeable body 1100 may have a first rigidity.

The first air-permeable body 1100 may be porous and allow for sufficient airflow via the open pathways such that the first air-permeable body 1100 has the ability to reduce the amount of reflected sound in a room environment 1002. Specifically, air may enter at least one of the plurality of first openings, the plurality of second openings, and/or the plurality of third openings and flow throughout the open pathways within the first air-permeable body 1100, thereby helping dissipate noise from the environment from which the air entered the corresponding plurality of openings of the first air-permeable body 1100.

The reduction in amount of reflected sound in a room is expressed by a Noise Reduction Coefficient (NRC) rating as described in American Society for Testing and Materials (ASTM) test method C423. This rating is the average of sound absorption coefficients at four ¼ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The first air-permeable body 1100 may exhibits an NRC of at least about 0.5 as measured between the first and second major surfaces 1101, 1102 of the first air-permeable body. In a preferred embodiment, the first air-permeable body 1100 of the present invention may have an NRC ranging from about 0.60 to about 0.99—including all value and sub-ranges there-between—as measured between the first and second major surfaces 1101, 1102 of the first air-permeable body. Non-limiting examples of NRC value for the first air-permeable body include 0.65, 0.7, 0.75, 0.8, 0.85, 0.9, 0.95—as measured between the first and second major surfaces 101, 102 of the first air-permeable body.

As the amount of airflow that is capable of entering the first air-permeable body 1100 via one of more of the plurality of first, second, and side openings increases, the NRC value of the corresponding first air-permeable body 1100 generally increases. Therefore, there is a generally inverse relationship to airflow resistance of the first air-permeable body 1100 and the NRC value of that first air-permeable body 1100.

The first air-permeable body 1100 may have a first airflow resistance ($R_1$) that is measured through the first air-permeable body 1100 at the first major surface 1101 (or the second major surface 1102). Airflow resistance is a measured by the following formula:

$$R = (P_A - P_{ATM})/\dot{V}$$

Where R is air flow resistance (measured in ohms); $P_A$ is the applied air pressure; $P_{ATM}$ is atmospheric air pressure; and $\dot{V}$ is volumetric airflow. The first airflow resistance ($R_1$) of the first air-permeable body 1100 may range from about 0.5 ohm to about 50 ohms. In a preferred embodiment, the airflow resistance of the first air-permeable body 1100 may range from about 0.5 ohms to about 35 ohms.

The first air-permeable body 1100 may have a porosity ranging from about 60% to about 98%—including all values and sub-ranges there between. In a preferred embodiment, the first air-permeable body 1100 may have a porosity ranging from about 75% to 95%—including all values and sub-ranges there between. According to the present invention, porosity refers to the following:

$$\% \text{ Porosity} = [V_{Total} - (V_{Binder} + V_{Fibers} + V_{Filler})]/V_{Total}$$

Where $V_{Total}$ refers to the total volume of the first air-permeable body 1100 as defined by the first major surface 1101, the second major surface 1102, and the side surfaces 1103. $V_{Binder}$ refers to the total volume occupied by the binder in the air-permeable body 1100. $V_{Fibers}$ refers to the total volume occupied by the fibrous material in the first air-permeable body 1100. $V_{Filler}$ refers to the total volume occupied by the filler in the first air-permeable body 1100. Thus, the % porosity represents the amount of free volume within the first air-permeable body 1100—whereby the free volume forms the open pathways of the first air-permeable body 1100. Thus, as porosity increases, the resulting airflow resistance of the first air-permeable body 1100 decreases and NRC value increases.

The first layer 1080 may further comprises a first attenuation coating 1300 applied to the first air-permeable body 1100. Specifically, the first attenuation coating 1300 may be applied to the second major surface 1102 of the first air-permeable body 1100. The first attenuation coating 1300 may be further applied to the side surface 1103 of the first air-permeable body 1100. In a preferred embodiment, the first attenuation coating 1300 may be applied to both the second major surface 1102 and the side surface 1103 of the first air-permeable body 1100. The first attenuation coating 1300 may extend continuously from the second major surface 1102 of the first air-permeable body 1100 to the side surface 1103 of the first air-permeable body 1100.

The first attenuation coating 1300 may comprise a polymer binder. The polymeric binder may be present in an amount ranging from about 1 wt. % to about 20 wt. % based on the total weight of the dry-state first attenuation coating 1300—including all percentages and sub-ranges there-between. Non-limiting examples of binder may include a starch-based polymer, polyvinyl alcohol (PVOH), a latex, polysaccharide polymers, polyvinyl acetate, cellulosic polymers, protein solution polymers, an acrylic polymer, polymaleic anhydride, epoxy resins, or a combination of two or more thereof.

In an alternative embodiment, the first attenuation coating 1300 may comprise a primer coating comprising the attenuation coating composition whereby no binder is used—i.e. 0 wt. % of binder. Subsequent attenuation coatings applied to the primer coating would comprise binder.

The first attenuation coating 1300 may comprise a filler. The filler may be present in an amount ranging from about 30 wt. % to about 99 wt. % based on the total weight of the dry-state first attenuation coating 1300—including all percentages and sub-ranges there-between. In a preferred embodiment, the filler may be present in an amount ranging from about 50 wt. % to about 99 wt. % based on the total weight of the dry-state first attenuation coating 1300—including all percentages and sub-ranges there-between. Non-limiting examples of filler may include pigments, powders of calcium carbonate, including limestone, titanium dioxide, sand, barium sulfate, clay, mica, dolomite, silica, talc, perlite, polymers, gypsum, wollastonite, glass, expanded-perlite, calcite, aluminum trihydrate, pigments, zinc oxide, or zinc sulfate.

In a non-limiting example, the first attenuation coating 1300 may be applied in the wet-state to the first air-permeable body 1100 by spray, roll, curtain coating, screen printing, extrusion coating, or dip application. The first attenuation coating 1300 may comprise a liquid carrier in the wet-state that is present in an amount ranging from about 20 wt. % to about 60 wt. % based on the total weight of the wet-state first attenuation coating 1300—including all percentages and sub-ranges there-between. The first attenuation coating 1300 may have a solids content in the wet-state that ranges from about 40 wt. % to about 80 wt. % based on the total weight of the wet-state first attenuation coating 1300—including all percentages and sub-ranges there-between.

The first attenuation coating 1300 may comprise an inner surface 1301 opposite an outer surface 1302. The first attenuation coating 1300 may have a first coating thickness as measured by the distance between the inner and outer surfaces 1301, 1302 of the first attenuation coating 1300. Although not limited to, the first attenuation coating thickness may range from about 5.0 mils to about 15 mils—including all thicknesses and sub-ranges there-between. The inner surface 1301 may face the first air-permeable body 1100. The outer surface 1302 may face away the first air-permeable body 1100.

The ratio of the first thickness of the first air-permeable body 1100 to the first coating thickness of the first attenuation coating 1300 may be at least 20:1. In a non-limiting embodiment, the ratio of the first thickness of the first air-permeable body 1100 to the first coating thickness of the first attenuation coating 1300 may be at least 30:1. In a non-limiting embodiment the ratio of the first thickness of the first air-permeable body 1100 to the first coating thickness of the first attenuation coating 1300 may range from about 30:1 to about 150:1—including all ratios and sub-ranges there-between. In a non-limiting embodiment the ratio of the first thickness of the first air-permeable body 1100 to the first coating thickness of the first attenuation coating 1300 may range from about 30:1 to about 100:1—including all ratios and sub-ranges there-between.

The first attenuation coating 1300 that is applied to the second major surface 1102 of the first air-permeable body 1100 may form a top attenuation coating 1310. The top attenuation coating 1310 may comprise an inner surface 1311 opposite an outer surface 1312. The inner surface 1312 of the top attenuation coating 1310 may face the second major surface 1102 of the first air-permeable body 1100. The outer surface 1311 of the top attenuation coating 1310 may face away from the second major surface 1102 of the first air-permeable body 1100. The top attenuation coating 1310 may have a thickness as measured by the distance between the inner and outer surfaces 1311, 1312 of the top attenuation coating 1310 that is substantially equal to the first coating thickness.

The first attenuation coating 1300 that is applied to the side surface 1103 of the first air-permeable body 1100 may form a side attenuation coating 1320. The side attenuation coating 1320 may comprise an inner surface 1321 opposite an outer surface 1322. The inner surface 1322 of the side attenuation coating 1320 may face the side surface 1103 of the first air-permeable body 1100. The outer surface 1321 of the side attenuation coating 1320 may face away from the side surface 1103 of the first air-permeable body 1100. The side attenuation coating 1320 may have a thickness as measured by the distance between the inner and outer surfaces 1321, 1322 of the side attenuation coating 1320 that is substantially equal to the first coating thickness.

Once applied, the combination of the first attenuation coating 1300 and the first air-permeable body 1100 form a first coated noise-reducing attenuation body 1080 (also referred to as "first coated body" 1080). In some embodiments, the first coated body 1080 may form a portion of the acoustic building panel 1020—as discussed further herein.

The first coated body 1080 may comprise a first major surface 1081 opposite a second major surface 1082 as well as side surfaces 1083 that extend between the first and second major surfaces 1081, 1082 of the first coated body 1080. The first major surface 1081 of the first coated body 1080 may comprise the first major surface 1101 of the first air-permeable body 1100. The second major surface 1082 of the first coated body 1080 may comprise the first attenuation coating 1300—specifically, top attenuation coating 1310. In particular, the second major surface 1082 of the first coated body 1080 may comprise the outer surface 1312 of the top attenuation coating 1310. The side surface 1083 of the first coated body 1080 may comprise the first attenuation coating 1300—specifically, the side attenuation coating 1320. In particular, the side surface 1083 of the first coated body 1080 may comprise the outer surface 1322 of the side attenuation coating 1320.

The first attenuation coating 1300 may be applied to the first air-permeable body 1100 such that the first attenuation coating 1300 seals at least a portion of the second major surface 1102 of the first air-permeable body 1100. The first attenuation coating 1300 may be applied to the first air-permeable body 1100 such that the first attenuation coating 1300 seals at least a portion of the side surface 1103 of the first air-permeable body 1100. In particular, the top attenuation coating 1310 may be applied to the second major surface 1102 of the first air-permeable body 1100 such that the top attenuation coating 1310 seals at least a portion of the plurality of second openings of the first air-permeable body 1100. In particular, the side attenuation coating 1320 may be applied to the side surface 1103 of the first air-permeable body 1100 such that the side attenuation coating 1320 seals at least a portion of the plurality of third openings of the first air-permeable body 1100.

The term "seal" according to the present invention refers to at least partially closing and/or blocking the openings that are in fluid communication with the open pathways that are present on the air-permeable body 1100. Therefore, when the second major surface 1102 and/or side surface 1103 of the first air-permeable body 1100 is sealed by the first attenuation coating 1300, open pathways may still be unblocked and allow for airflow therein. However, the airflow may terminate once reaching the second major surface 1102 and/or side surface 1103 of the first air-permeable body 1100 as the outlet formed by the openings are at least partially (or fully) closed/blocked.

The degree of blockage provided by the attenuation coating seal for each opening present on the second major surface 1102 and side surface 1103 of the first air-permeable body 1100 may be reflected by the increase in airflow resistance between the naked first air-permeable body 1100 and the first coated body 1080, as discussed further herein.

As such, the present invention provides that the first coated body 1080 may allow for airflow to enter the first air-permeable body 1100 at the first major surface 1101 and travel through the open pathways within the first air-permeable body 1100 but will substantially terminate at the second major surface 1102 and/or side surface 1103 when reaching the corresponding attenuation coating 1300 applied thereto.

The top attenuation coating 1310 may be present on the second major surface 1102 of the first air-permeable body 1100 in an amount ranging from about 10 g/ft$^2$ to about 45 g/ft$^2$—including all amounts and sub-ranged there-between. In a preferred embodiment, the top attenuation coating 1310 may be present on the second major surface 1102 of the first air-permeable body 1100 in an amount ranging from about 14 g/ft$^2$ to about 30 g/ft$^2$ including all amounts and sub-ranged there-between.

The top attenuation coating 1310 may be applied as one or more sub-layers that together form the full top attenuation coating 1310. The sub-layers may comprise a first sub-layer and a second sublayer. The first sub-layer, which may also be referred to as a "primer layer," may be applied directly to the second major surface 1102 of the first air-permeable body 1100, and the second sub-layer may be applied directly to the first sub-layer. In certain embodiments, additional sub-layers may be applied atop the second sub-layer.

The first sub-layer may be applied in a dry amount ranging from about 5 g/ft$^2$ to about 30 g/ft$^2$—including all amounts and sub-ranges there-between. In some embodiments, the first sub-layer may be applied in a dry amount ranging from about 20 g/ft$^2$ to about 30 g/ft$^2$—including all amounts and sub-ranges there-between. The second sub-layer may be applied in a dry amount ranging from about 5 g/ft$^2$ to about 20 g/ft$^2$—including all amounts and sub-ranges there-between. In some embodiments, the second sub-layer may be applied in a dry amount ranging from about 14 g/ft$^2$ to about 16 g/ft$^2$—including all amounts and sub-ranges there-between.

The application of the top attenuation coating 1310 as two or more sub-layers helps maintain the NRC performance of the first air-permeable body 1100 while still providing the desired attenuation properties of the resulting first coated body 1080, because the first sub-layer may be applied as a fraction of the overall top attenuation coating 1310, thereby reducing the overall depth of which the attenuation coating penetrates into the first air-permeable body 1100. In a non-limiting embodiment, the top attenuation coating 1310 may be formed from three sub-layers. In a non-limiting embodiment, the top attenuation coating 1310 may be formed from four sub-layers. The result is a first coated body 1080 that has the majority of the top attenuation coating 1310 remain atop the second major surface 1102 of the first-air permeable body 1100.

The side attenuation coating 1320 may be present on the side surface 1103 of the first air-permeable body 1100 in a dry amount ranging from about 4 to about 8 grams/linear foot—including all amounts and sub-ranged there-between. In a preferred embodiment, the side attenuation coating 1320 may be present on the side surface 1103 of the first air-permeable body 1100 in an amount ranging from about 5 g/linear foot to about 6 g/linear foot—including all amounts and sub-ranged there-between. In a non-limiting embodiment, a building panel having a length and width of about 2', the resulting side attenuation coating 1320 would be present in an amount of about 8 grams to about 16 grams.

The first coated body 1080 may comprise a second airflow resistance as measured at the first major surface 1081 of the first coated body 1080 where the first major surface 1101 of the first air-permeable body 1100 is still exposed. The second air flow resistance of the second coated body 1080 may be substantially equal to the first airflow resistance of the sole first air-permeable body 1100. In some embodiments, the second air flow resistance of the first coated body 1080 may up to 33% greater than the first airflow resistance of the sole first air-permeable body 1100.

The first coated body 1080 may comprise a third airflow resistance as measured at the second major surface 1082 of the coated body 1080 where the first sound attenuation coating 1300 (the top attenuation coating 1310) is located. The third airflow resistance is greater than the first airflow resistance. In some embodiments, the third airflow resistance is at least one order of magnitude greater than the second airflow resistance. In some embodiments, the third airflow resistance is at least one order of magnitude greater than the first airflow resistance. In some embodiments, the third airflow resistance is at least two orders of magnitude greater than the second airflow resistance. In some embodiments, the third airflow resistance is at least two orders of magnitude greater than the first airflow resistance.

The ratio of the third airflow resistance to the second airflow resistance may range from about 10:1 to about 100:1—including all ratios and sub-ranges there-between. The ratio of the third airflow resistance to the first airflow resistance may range from about 10:1 to about 100:1—including all ratios and sub-ranges there-between.

The second layer 1090 may comprise a second air-permeable body 1400 and a second attenuation coating 1500 applied thereto (also referred to as a "second attenuation coating"). The second air-permeable body 1400 of the second layer 1090 may comprise a first major surface 1401 (also referred to a "lower major surface") that is opposite a second major surface 1402 (also referred to as an "upper major surface") as well as side surfaces 1403 that extends between the first and second major surfaces 1401, 1402 of the second air-permeable body 1400. The second air-permeable body 1400 may have an overall length and width. The length of the second air-permeable body 1400 may be substantially equal to the length of the acoustic building panel 1020. The width of the second air-permeable body 1400 may be substantially equal to the width of the acoustic building panel 1020.

The second air-permeable body 1400 may have a first thickness as measured by the distance between the first and second major surfaces 1401, 1402 of the second air-permeable body 1400. The first thickness may range from about 0.25 inches to about 3.0 inches—including all thickness and sub-ranges there-between.

According to some embodiments, the first major surface 1401 of the second air-permeable body 1400 may have a first length and a first width and the second major surface 1402 of the second air-permeable body 1400 may have a second length and a second width. According to some embodiments, the first width of the first major surface 1401 may be substantially equal to the second width of the second major surface 1402. According to some embodiments, the first length of the first major surface 1401 may be substantially equal to the second length of the second major surface 1402. In other embodiments, the first width of the first major surface 1401 may be less than the second width of the second major surface 1402. According to some embodiments, the first length of the first major surface 1401 may be less than the second length of the second major surface 1402.

The second air-permeable body 1400 may be a porous structure. The term "porous structure" refers to the second air-permeable body 1400 comprising a plurality of open pathways that extend between a plurality of first openings present on the first major surface 1401, a plurality of second openings present on the second major surface 1402, and a plurality of third openings present on the side surfaces 1403 of the second air-permeable body 1400. The open pathways may extend directly or indirectly between the plurality of first openings and the plurality of second openings. The open pathways may extend directly or indirectly between the plurality of third openings and plurality of second openings. The open pathways may extend directly or indirectly between the plurality of first openings and the plurality of third openings.

As discussed further herein, the open pathways may be open voids within the second air-permeable body 1400 that allow for airflow through and between the first major surface 1401, the second major surface 1402, and/or the third major surface 1403, as well as within the second air-permeable body 1400. The open pathways may be considered to create fluid communication between various points within the second air-permeable body 1400.

The second air-permeable body 1400 may comprise a fibrous material. The fibrous material may be selected from one or more of the fibers previously discussed with respect to the first air-permeable body 1100. The fibrous material may be present in an amount ranging from about 5 wt. % to about 99 wt. % based on the total dry weight of the second air-permeable body 1400—including all values and sub-ranges there-between.

The second air-permeable body 1400 may comprise a filler. The filler may be selected from one or more of the filler materials previously discussed with respect to the first air-permeable body 1100. The filler may be present in an amount ranging from about 0 wt. % to about 80 wt. % based on the total dry weight of the second air-permeable body 1400—including all values and sub-ranges there-between. In other embodiments, the filler may be present in an amount ranging from about 5 wt. % to about 70 wt. % based on the total dry weight of the second air-permeable body 1400—including all values and sub-ranges there-between.

The second air-permeable body 1400 may comprise a binder. The binder may be selected from one or more of the binders previously discussed with respect to the second air-permeable body 1400. The binder may be present in an amount ranging from about 1.0 wt. % to about 25.0 wt. % based on the total dry weight of the second air-permeable body 1400—including all percentages and sub-ranges there-between. In a preferred embodiment, the binder may be present in an amount ranging from about 3.0 wt. % to about 10.0 wt. % based on the total dry weight of the second air-permeable body 1400—including all percentages and sub-ranges there-between.

In non-limiting embodiments, the first air-permeable body 1100 may further comprise one or more additives include defoamers, wetting agents, biocides, dispersing agents, flame retardants (such as alumina tri-hydrate), and the like. The additive may be present in an amount ranging from about 0.01 wt. % to about 30 wt. % based on the total dry weight of the second air-permeable body 1400—including all values and sub-ranges there-between.

The second air-permeable body 1400 may have a first density ranging from about 2 lb/ft$^3$ to about 16 lb/ft$^3$—including all densities and sub-ranges there-between. In a preferred, embodiment the second air-permeable body 1400 may have a first density ranging from about 5 lb/ft$^3$ to about 14 lb/ft$^3$—including all densities and sub-ranges there-between. The second air-permeable body 1400 may have a second rigidity.

The second air-permeable body 1400 may be porous and allow for sufficient airflow via the open pathways such that the second air-permeable body 1400 has the ability to reduce the amount of reflected sound in a plenary space 1003. Specifically, air may enter at least one of the plurality of first openings, the plurality of second openings, and/or the plurality of third openings and flow throughout the open pathways within the second air-permeable body 1400, thereby helping dissipate noise from the environment from which the air entered the corresponding plurality of openings of the second air-permeable body 1400.

The second air-permeable body 1400 may exhibits an NRC of at least about 0.5 as measured between the first and second major surfaces 1401, 1402 of the second air-permeable body 1400. In a preferred embodiment, the second air-permeable body 1400 of the present invention may have an NRC ranging from about 0.60 to about 0.99—including all value and sub-ranges there-between—as measured between the first and second major surfaces 1401, 1402 of the second air-permeable body 1400. Non-limiting examples of NRC value for the second air-permeable body 1400 include 0.65, 0.7, 0.75, 0.8, 0.85, 0.9, 0.95—as measured between the first and second major surfaces 1401, 1402 of the second air-permeable body 1400.

As the amount of airflow that is capable of entering the second air-permeable body 1400 via one of more of the plurality of first, second, and side openings increases, the NRC value of the corresponding second air-permeable body 1400 generally increases. Therefore, there is a generally inverse relationship to airflow resistance of the second air-permeable body 1400 and the NRC value of that second air-permeable body 1400.

The second air-permeable body 1400 may have a first airflow resistance that is measured through the second air-permeable body 1400 at the first major surface 1401 (or the second major surface 1402). The first airflow resistance of the second air-permeable body 1400 may range from about 0.5 ohm to about 50 ohms. In a preferred embodiment, the airflow resistance of the second air-permeable body 1400 may range from about 0.5 ohms to about 35 ohms.

The second air-permeable body 1400 may have a porosity ranging from about 60% to about 98%—including all values and sub-ranges there between. In a preferred embodiment, the second air-permeable body 1400 may have a porosity ranging from about 75% to 95%—including all values and sub-ranges there between.

The second layer 1090 may further comprises a second attenuation coating 1500 applied to the second air-permeable body 1400. Specifically, the second attenuation coating 1500 may be applied to the second major surface 1402 of the second air-permeable body 1400. The second attenuation coating 1500 may be further applied to the side surface 1403 of the second air-permeable body 1400. In a preferred embodiment, the second attenuation coating 1500 may be applied to both the second major surface 1402 and the side surface 1403 of the second air-permeable body 1400. The second attenuation coating 1500 may extend continuously from the second major surface 1402 of the second air-permeable body 1400 to the side surface 1403 of the second air-permeable body 1400.

The second attenuation coating 1500 may comprise a polymer binder. The polymeric binder of the second attenuation coating 1500 may be selected from one of the binders discussed with respect to the first attenuation coating 1300. The binder may be present in the second attenuation coating 1500 in an amount ranging from about 1 wt. % to about 20 wt. % based on the total weight of the dry-state second attenuation coating 1500—including all percentages and sub-ranges there-between.

In an alternative embodiment, the second attenuation coating 1500 may comprise a primer coating comprising the attenuation coating composition whereby no binder is used—i.e. 0 wt. % of binder. Subsequent attenuation coatings applied to the primer coating would comprise binder.

The second attenuation coating 1500 may comprise a filler. The filler of the second attenuation coating 1500 may be selected from one or more of the fillers discussed with respect to the first attenuation coating 1300. The filler may be present in an amount ranging from about 30 wt. % to about 99 wt. % based on the total weight of the dry-state second attenuation coating 1500—including all percentages and sub-ranges there-between. In a preferred embodiment, the filler may be present in an amount ranging from about 50 wt. % to about 99 wt. % based on the total weight of the dry-state second attenuation coating 1500—including all percentages and sub-ranges there-between.

In a non-limiting example, the second attenuation coating 1500 may be applied in the wet-state to the second air-permeable body 1400 by spray, roll, curtain coating, screen printing, extrusion coating, or dip application. The second attenuation coating 1500 may comprise a liquid carrier in the wet-state that is present in an amount ranging from about 20 wt. % to about 60 wt. % based on the total weight of the wet-state second attenuation coating 1500—including all percentages and sub-ranges there-between. The second attenuation coating 1500 may have a solids content in the wet-state that ranges from about 40 wt. % to about 80 wt. % based on the total weight of the wet-state second attenuation coating 1500—including all percentages and sub-ranges there-between.

The second attenuation coating 1500 may comprise an inner surface 1501 opposite an outer surface 1502. The second attenuation coating 1500 may have a second coating thickness as measured by the distance between the inner and outer surfaces 1501, 1502 of the second attenuation coating 1500. Although not limited to, the second coating thickness may range from about 5.0 mils to about 15 mils—including all thicknesses and sub-ranges there-between. The inner surface 1501 may face the second air-permeable body 1400. The outer surface 1502 may face away the second air-permeable body 1400.

The ratio of the second thickness of the second air-permeable body 1400 to the second coating thickness of the second attenuation coating 1500 may be at least 20:1. In a non-limiting embodiment, the ratio of the second thickness of the second air-permeable body 1400 to the second coating thickness of the second attenuation coating 1500 may be at least 30:1. In a non-limiting embodiment the ratio of the second thickness of the second air-permeable body 1400 to the second coating thickness of the second attenuation coating 1500 may range from about 30:1 to about 150:1—including all ratios and sub-ranges there-between. In a non-limiting embodiment the ratio of the second thickness of the second air-permeable body 1400 to the second coating thickness of the second attenuation coating 1500 may range from about 30:1 to about 100:1—including all ratios and sub-ranges there-between.

In some embodiments, the second attenuation coating 1500 that is applied to the second major surface 1402 of the second air-permeable body 1400 may form a top attenuation coating 1510. The top attenuation coating 1510 may comprise an inner surface 1511 opposite an outer surface 1512. The inner surface 1512 of the top attenuation coating 1510 may face the second major surface 1402 of the second air-permeable body 1400. The outer surface 1511 of the top attenuation coating 1510 may face away from the second major surface 1402 of the second air-permeable body 1400. The top attenuation coating 1510 may have a thickness as measured by the distance between the inner and outer surfaces 1511, 1512 of the top attenuation coating 1510 that is substantially equal to the second coating thickness.

In some embodiments, the second attenuation coating 1500 that is applied to the side surface 1403 of the second air-permeable body 1400 may form a side attenuation coating 1520. The side attenuation coating 1520 may comprise an inner surface 1521 opposite an outer surface 1522. The inner surface 1522 of the side attenuation coating 1520 may face the side surface 1403 of the second air-permeable body 1400. The outer surface 1521 of the side attenuation coating 1520 may face away from the side surface 1403 of the second air-permeable body 1400. The side attenuation coating 1520 may have a thickness as measured by the distance between the inner and outer surfaces 1521, 1522 of the side attenuation coating 1520 that is substantially equal to the second coating thickness.

As demonstrated in FIG. 3, in some embodiments, the second attenuation coating 1500 may include the top attenuation coating 1510 and the side attenuation coating 1520. As demonstrated in FIG. 3A, in other embodiments, the second attenuation coating 1500 may comprise only the top attenuation coating 1510, whereby no side attenuation coating is applied to the second air-permeable body 1400.

Once applied, the combination of the second attenuation coating 1500 and the second air-permeable body 1400 form a second coated noise-reducing attenuation body 1090 (also referred to as "second coated body" 1090). In some embodiments, the second coated body 1090 may form a portion of the acoustic building panel 1020—as discussed further herein.

Referring to FIG. 3, the second coated body 1090 may comprise a first major surface 1091 opposite a second major surface 1092 as well as side surfaces 1093 that extend between the first and second major surfaces 1091, 1092 of the second coated body 1080. The first major surface 1091 of the second coated body 1090 may comprise the first major surface 1401 of the second air-permeable body 1400. The second major surface 1092 of the first coated body 1080 may comprise the second attenuation coating 1500—specifically, top attenuation coating 1510. In particular, the second major surface 1092 of the second coated body 1090 may comprise the outer surface 1512 of the top attenuation coating 1510. The side surface 1093 of the second coated body 1090 may comprise the second attenuation coating 1500—specifically, the side attenuation coating 1520. In particular, the side surface 1093 of the second coated body 1090 may comprise the outer surface 1522 of the side attenuation coating 1520.

Figure 3A:
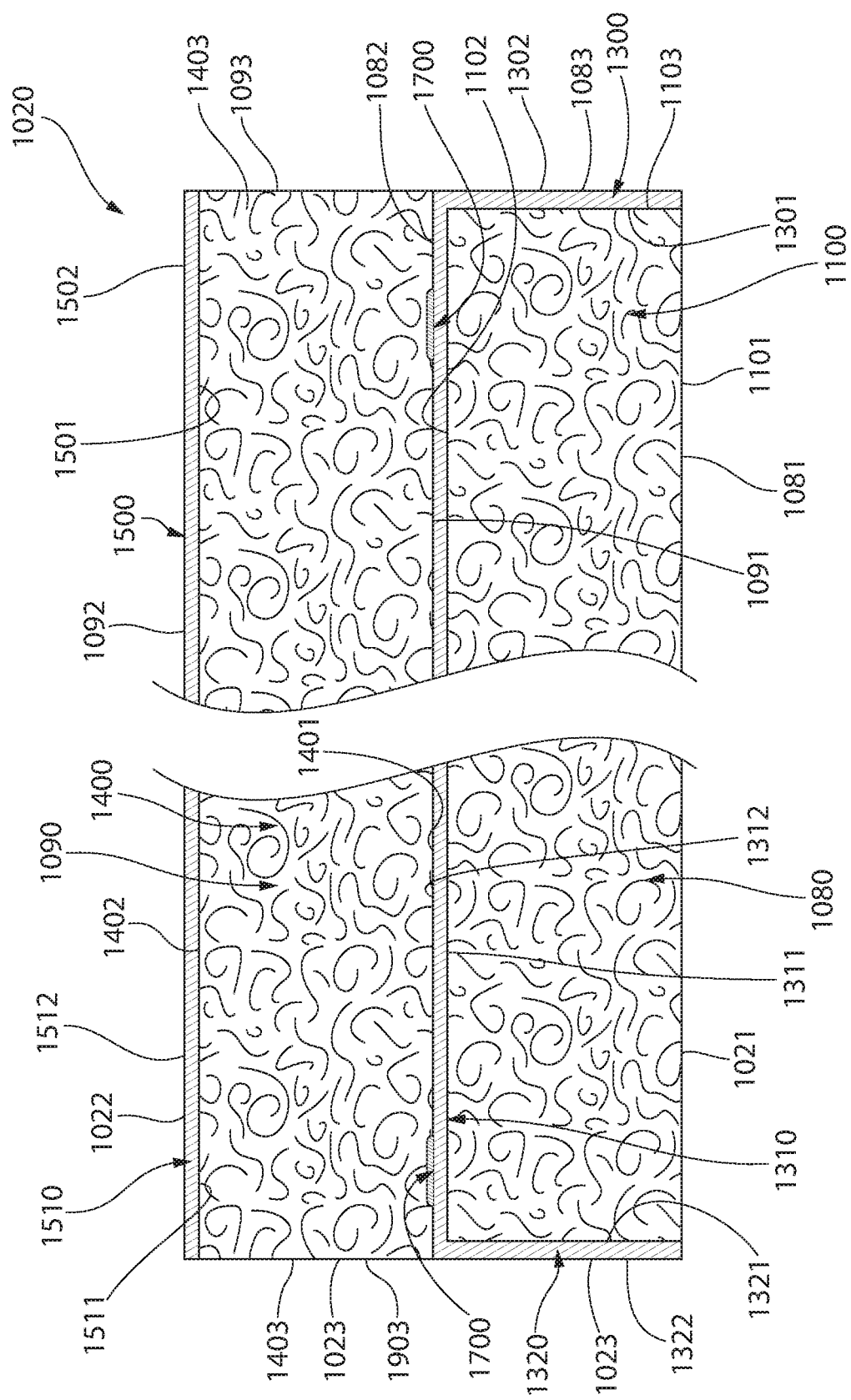
FIG. 3A is a cross-sectional view of the acoustic building panel along line III-III of FIG. 1 according to another embodiment.

Referring to FIG. 3A, the second attenuation coating 1500 comprises only the top attenuation coating 1510 and no side attenuation coating 1520, the side surface 1093 of the second coated body 1090 may comprise the side surface 1403 of the second air-permeable body 1400. Stated otherwise, the second coated body 1090 may be substantially free of the second attenuation coating 1500 on the side surface 1403 of the second body 1400. According to such embodiments, the side exposed surface 1023 of the building panel 1020 may comprise both the first attenuation coating 1300—specifically, the outer surface 1322 of the side attenuation coating 1320 as well as the second air-permeable body 1400—specifically, the side surface 1403 of the second air-permeable body 1400.

The second attenuation coating 1500 may be applied to the second air-permeable body 1400 such that the second attenuation coating 1500 seals at least a portion of the second major surface 1402 of the second air-permeable body 1400. The second attenuation coating 1500 may be applied to the second air-permeable body 1400 such that the second attenuation coating 1500 seals at least a portion of the side surface 1403 of the second air-permeable body 1400. In particular, the top attenuation coating 1510 may be applied to the second major surface 1402 of the second air-permeable body 1400 such that the top attenuation coating 1510 seals at least a portion of the plurality of second openings of the first air-permeable body 1100. In particular, the side attenuation coating 1520 may be applied to the side surface 1403 of the second air-permeable body 1400 such that the side attenuation coating 1520 seals at least a portion of the plurality of third openings of the second air-permeable body 1400.

Similar to the first coated body 1080, the degree of blockage provided by the second attenuation coating 1500 that seals each opening present on the second major surface 1402 and side surface 1403 of the second air-permeable body 1400 may be reflected by the increase in airflow resistance between the naked second air-permeable body 1400 and the second coated body 1090.

The top attenuation coating 1510 may be present on the second major surface 1402 of the second air-permeable body 1400 in an amount ranging from about 10 g/ft$^2$ to about 45 g/ft$^2$—including all amounts and sub-ranged there-between. In a preferred embodiment, the top attenuation coating 1510 may be present on the second major surface 1402 of the second air-permeable body 1400 in an amount ranging from about 14 g/ft$^2$ to about 30 g/ft$^2$ including all amounts and sub-ranged there-between.

The top attenuation coating 1510 may be applied as one or more sub-layers that together form the full top attenuation coating 1510. The sub-layers may comprise a first sub-layer and a second sublayer. The first sub-layer, which may also be referred to as a "primer layer," may be applied directly to the second major surface 1402 of the second air-permeable body 1400, and the second sub-layer may be applied directly to the first sub-layer. In certain embodiments, additional sub-layers may be applied atop the second sub-layer.

The first sub-layer may be applied in a dry amount ranging from about 5 g/ft$^2$ to about 25 g/ft$^2$—including all amounts and sub-ranges there-between. In some embodiments, the first sub-layer may be applied in a dry amount ranging from about 17 g/ft$^2$ to about 19 g/ft$^2$—including all amounts and sub-ranges there-between. The second sub-layer may be applied in a dry amount ranging from about 5 g/ft$^2$ to about 20 g/ft$^2$—including all amounts and sub-ranges there-between. In some embodiments, the second sub-layer may be applied in a dry amount ranging from about 10 g/ft$^2$ to about 12 g/ft$^2$—including all amounts and sub-ranges there-between.

The application of the top attenuation coating 1510 as two or more sub-layers helps maintain the NRC performance of the second air-permeable body 1400 while still providing the desired attenuation properties of the resulting first coated body 1080, because the first sub-layer may be applied as a fraction of the overall top attenuation coating 1510, thereby reducing the overall depth of which the attenuation coating penetrates into the second air-permeable body 1400. In a non-limiting embodiment, the top attenuation coating 1510 may be formed from three sub-layers. In a non-limiting embodiment, the top attenuation coating 1510 may be formed from four sub-layers. The result is a second coated body 1090 that has the majority of the top attenuation coating 1510 remain atop the second major surface 1402 of the second air-permeable body 1100.

The side attenuation coating 1520 may be present on the side surface 1403 of the second air-permeable body 1400 in a dry amount ranging from about 4 to about 8 grams/linear foot—including all amounts and sub-ranged there-between. In a preferred embodiment, the side attenuation coating 1520 may be present on the side surface 1403 of the second air-permeable body 1400 in an amount ranging from about 5 g/linear foot to about 6 g/linear foot—including all amounts and sub-ranged there-between. In a non-limiting embodiment, a building panel having a length and width of about 2′, the resulting side attenuation coating 1520 would be present in an amount of about 8 grams to about 16 grams.

The second coated body 1090 may comprise a second airflow resistance as measured at the first major surface 1091 of the second coated body 1090 where the first major surface 1401 of the second air-permeable body 1400 is still exposed. The second air flow resistance of the second coated body 1090 may be substantially equal to the first airflow resistance of the sole second air-permeable body 1400. In some embodiments, the second air flow resistance of the second coated body 1090 may up to 33% greater than the second airflow resistance of the sole second air-permeable body 1400.

The first coated body 1090 may comprise a third airflow resistance as measured at the second major surface 1092 of the coated body 1090 where the second sound attenuation coating 1500 (the top attenuation coating 1510) is located. The third airflow resistance is greater than the first airflow resistance. In some embodiments, the third airflow resistance is at least one order of magnitude greater than the second airflow resistance. In some embodiments, the third airflow resistance is at least one order of magnitude greater than the first airflow resistance. In some embodiments, the third airflow resistance is at least two orders of magnitude greater than the second airflow resistance. In some embodiments, the third airflow resistance is at least two orders of magnitude greater than the first airflow resistance.

The ratio of the third airflow resistance to the second airflow resistance may range from about 10:1 to about 100:1—including all ratios and sub-ranges there-between. The ratio of the third airflow resistance to the first airflow resistance may range from about 10:1 to about 100:1—including all ratios and sub-ranges there-between.

The acoustic building panel 1020 of this embodiment may be formed by combining the first coated body 1080 and the second coated body 1090. The first coated body 1080 and the second coated body 1090 may be joined together such that an interface is formed between the first major surface 1091 of the second coated body 1090 and the second major surface 1082 of the first coated body 1080. In the interface, at least a portion of the first major surface 1091 of the second coated body 1090 and the second major surface 1082 of the first coated body 1080 are in contact.

In particular, the interface may be formed between the first attenuation coating 1300 of the first coated body 1080 and the second air-permeable body 1400 of the second coated body 1090. In the interface, at least a portion of the first attenuation coating 1300 of the first coated body 1080 and the second air-permeable body 1400 of the second coated body 1090 are in contact.

The interface may be formed between the outer surface 1312 of the attenuation coating 1300 of the first coated body 1080 and the first major surface 1401 of the second air-permeable body 1400 of the second coated body 1090. In the interface, at least a portion of the outer surface 1312 of the first attenuation coating 1300 of the first coated body 1080 and the first major surface 1401 of the second air-permeable body 1400 of the second coated body 1090 are in contact.

In some embodiments, the first coated body 1080 and the second coated body 1090 may be joined together such that the first coated body 1080 and the second coated body 1090 are coupled together. In some embodiments, the first coated body 1080 and the second coated body 1090 may be coupled together by an adhesive 1700—whereby the adhesive 1700 is present in the interface between the first and second coated bodies 1080, 1090. In other embodiments, the first coated body 1080 may be coupled to the second coated body 1090 by a fastener (not shown).

The adhesive 1700 may be applied in strips, a bead, or as a coating. In a preferred embodiment, the adhesive 1700 is applied as a bead. The total amount of adhesive 1700 that may be applied as to the first layer 1080 and/or second layer 1090 may total to an amount that ranges from about 4.0 $g/ft^2$ to about 7.0 $g/ft^2$—including all amounts and sub-ranges there-between. In a preferred embodiment, the total amount of adhesive 1700 that may be applied as to the first layer 1080 and/or second layer 1090 may total to an amount that ranges from about 4.5 $g/ft^2$ to about 6.5 $g/ft^2$—including all amounts and sub-ranges there-between.

The adhesive 1700 may be applied as a bead (or line), whereby the total amount of adhesive applied as a bead results in the adhesive being present between the first layer 1090 and the second layer 1090 in an amount ranging from about 4.5 $g/ft^2$ to about 6.5 $g/ft^2$—including all amounts and sub-ranges there-between.

The adhesive 1700 may be applied between the first and second layers 1080, 1090 according to the methodology described in U.S. Pat. No. 9,390,700, herein incorporated by reference in its entirety and forms a part of the present application. Specifically, each of the first and second layers 1080, 1090 may comprise a central region and a perimeter region on the respective major surface, whereby the adhesive 1700 is present within the perimeter regions of the respective first and second layers 1080, 1090 and the central region of each respective first and second layer is substantially free of adhesive.

The resulting building panel 1020 may have the first exposed major surface 1021 of the acoustic building panel 1020 may comprise the first major surface 1081 of the first coated body 1080—i.e., the first major exposed surface 1021 of the building panel 1020 may comprise the first major surface 1101 of the first air-permeable layer 1100. According to such embodiments, the second major exposed surface 1022 may comprise the second major surface 1092 of the second coated body 1090—i.e., the second major exposed surface 1022 of the building panel 1020 may comprise the outer surface 1512 of the second attenuation coating 1500 of the second coated body 1090.

According to such embodiments, the side exposed surface 1023 of the building panel 1020 may comprise the side surface 1083 of the first coated body 1080 and the side surface 1093 of the second coated body 1090. The side exposed surface 1023 of the building panel 1020 may comprise the side attenuation coating 1320 of the first attenuation coating 1300 as well as the side attenuation coating 1520 of the second attenuation coating 1500. The side exposed surface 1023 of the building panel 1020 may comprise the outer surface 1322 of the side attenuation coating 1320 of the first attenuation coating 1300 as well as the outer surface 1522 of the side attenuation coating 1520 of the second attenuation coating 1500.

Referring now to FIGS. 4 and 5, the acoustic building panel 1020 of this embodiment may be positioned within a ceiling system 1001 such that the first major surface 1021 of the acoustic building panel 1020 faces the active room environment 1003 and the second major surface 1022 faces the plenary space 1002. Specifically, the acoustic building panel 1020 of this embodiment may be positioned within a ceiling system 1001 such that the first major surface 1081 of the first coated body 1080 faces the active room environment 1003 and second major surface 1092 of the second coated body 1090 faces the plenary space 1002. Specifically, the acoustic building panel 1020 of this embodiment may be positioned within a ceiling system 1001 such that the first major surface 1101 of the first air-permeable body 1100 faces the active room environment 1003 and outer surface 1502 of the second attenuation coating 1500 faces the plenary space 1002.

Additionally, according to this embodiment, the acoustic building panel 1020 of this embodiment may be positioned within a ceiling system 1001 such that the side surface 1023 face the plenary space 1002.

Ceiling systems 1001 produced using acoustic building panel 1020 according to this embodiment may exhibit a CAC value greater than 40 dB, preferably greater than 45 dB, more preferably greater than 50 dB. In a non-limiting embodiment, the acoustic building panel 20b may exhibit a CAC value ranging from 40 dB to about 60 dB—including all CAC values and sub-ranges there-between. Additionally, according to this embodiment, the acoustic building panel 20b may exhibit an NRC value of at least 0.75. In a non-limiting embodiment, the acoustic building panel 20b may exhibit an NRC value ranging from 0.5 to about 0.9—including all NRC values and sub-ranges there-between.

Referring now to FIGS. 6-10, an acoustic building panel 2020 is illustrated in accordance with another embodiment of the present invention. The acoustic building panel 2020 is similar to the acoustic building panel 1020 except as described herein below. The description of the acoustic building panel 1020 above generally applies to the acoustic building panel 2020 described below except with regard to the differences specifically noted below. A similar numbering scheme will be used for the acoustic building panel 2020 as with the acoustic building panel 1020 except that the numbers having the 2000-series will be used.

According to this embodiment, the acoustic building panel 2020 may be formed by joining together the first coated body 2080 and the second coated body 2090 such that an interface is formed between the second major surface 2082 of the first coated body 2080 and the second major surface 2092 of the second coated body 2090. In the interface, at least a portion of the second major surface 2092 of the second coated body 2090 and the second major surface 2082 of the first coated body 2080 are in contact. The adhesive 2700 may be present in the interface formed between the second major surface 2082 of the first coated body 2080 and the second major surface 2092 of the second coated body 2090.

The interface may be formed between the top attenuation coating 2510 of the second attenuation coating 2500 of the second coated body 2090 and the top attenuation coating 2320 of the first coated body 2080. In the interface, at least a portion of the top attenuation coating 2510 of the second attenuation coating 2500 of the second coated body 2090 and the top attenuation coating 2320 of the first coated body 2080 are in contact. The adhesive 2700 may be present in the interface formed between the top attenuation coating 2510 of the second attenuation coating 2500 of the second coated body 2090 and the top attenuation coating 2320 of the first coated body 2080.

The interface may be formed between the outer surface 2512 of the top attenuation coating 2510 of the second attenuation coating 2500 of the second coated body 2090 and the outer surface top attenuation coating 2310 of the first coated body 2080. In the interface, at least a portion of the outer surface 2512 of the top attenuation coating 2510 of the second attenuation coating 2500 of the second coated body 2090 and the outer surface of the top attenuation coating 2320 of the first coated body 2080 are in contact. The adhesive 2700 may be present in the interface formed between the outer surface 2512 of the top attenuation coating 2510 of the second attenuation coating 2500 of the second coated body 2090 and the outer surface of the top attenuation coating 2320 of the first coated body 2080.

Figure 9:
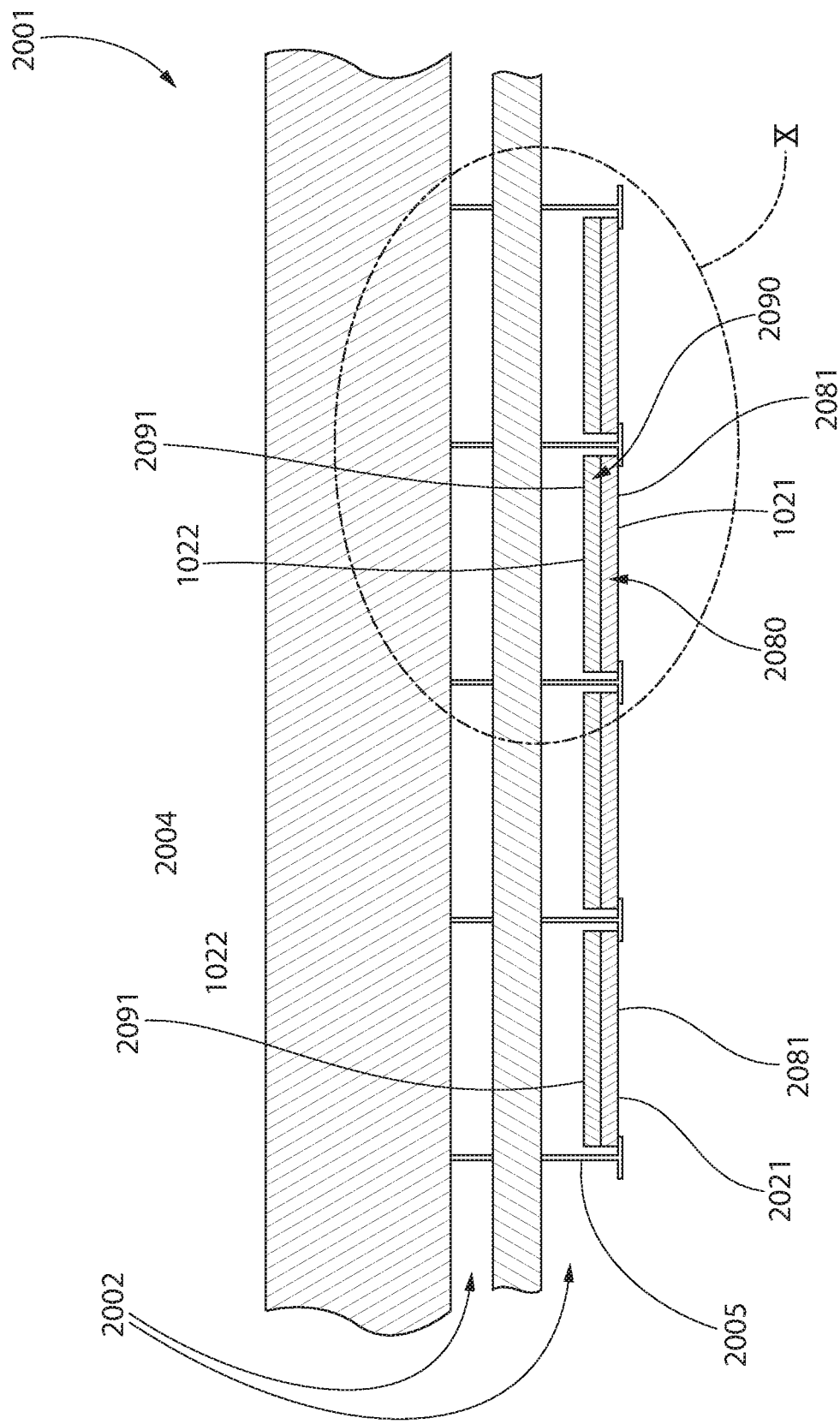
FIG. 9 is a side view of building system comprising a plurality of the acoustic building panels of FIG. 6 according to the present invention.
Figure 10:
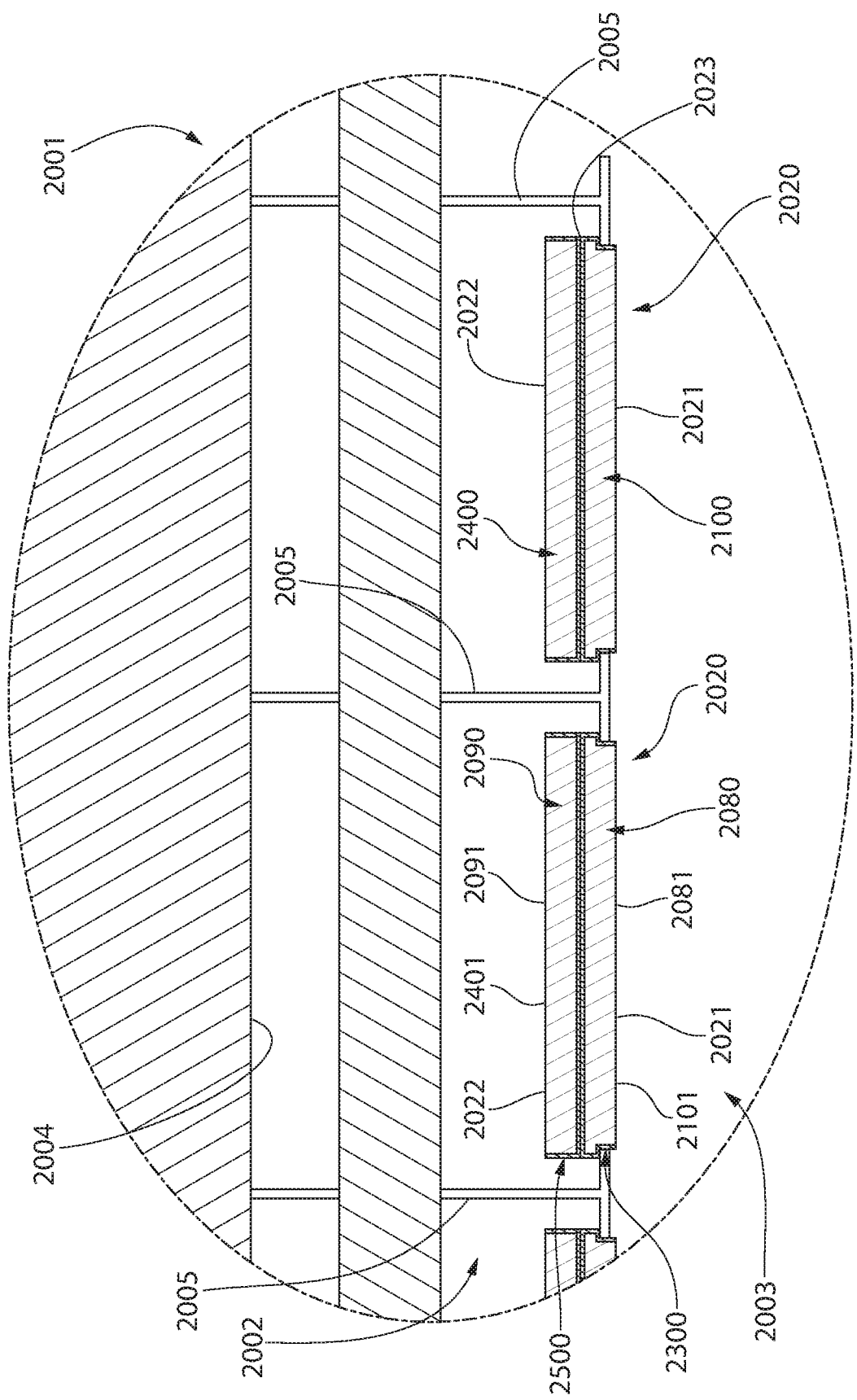
FIG. 10 is a close-up cross-sectional view of region X of the building system of FIG. 9.

Referring now to FIGS. 9 and 10, the acoustic building panel 2020 of this embodiment may be positioned within a ceiling system 2001 such that the first major surface 2021 of the acoustic building panel 2020 faces the active room environment 2003 and the second major surface 2022 faces the plenary space 2002. According to this embodiment, the first major exposed surface 2021 of the building panel 2020 is formed from the first major surface 2081 of the first coated body 2080 and the second major exposed surface 2022 of the building panel 2020 is formed from the first major surface 2091 of the second coated body 2090. Specifically, the acoustic building panel 2020 of this embodiment may be positioned within a ceiling system 2001 such that the first major surface 2101 of the first air-permeable body 2100 faces the active room environment 2003 and the first major surface 2401 of the second air-permeable body 2400 faces the plenary space 2002.

Figure 8:
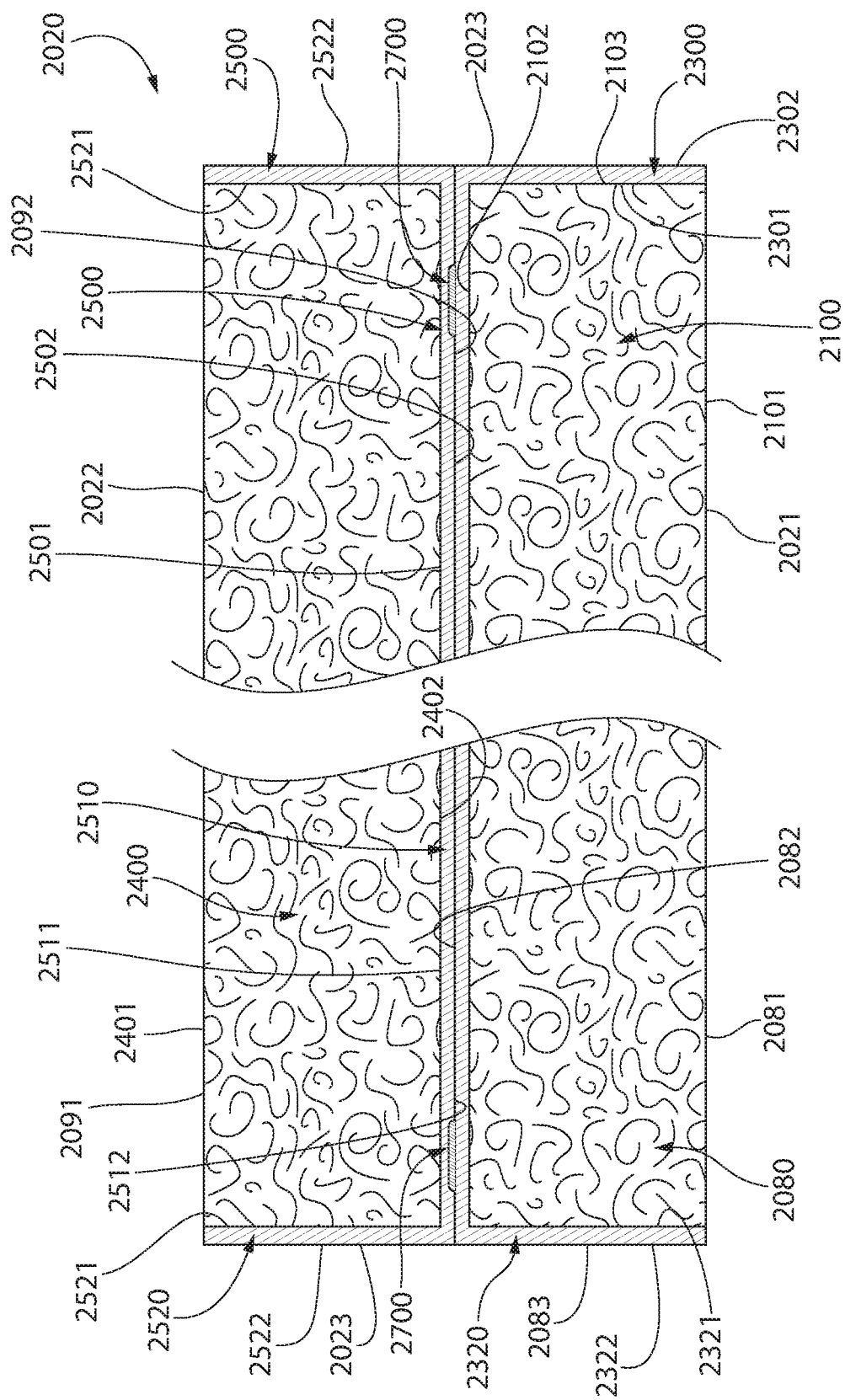
FIG. 8 is a cross-sectional view of the acoustic building panel along line VIII-VIII of FIG. 6.

As demonstrated in FIG. 8, the second attenuation coating 2500 may include the top attenuation coating 2510 and the side attenuation coating 2520. As demonstrated in FIG. 8A, the present invention includes other embodiments where the second attenuation coating 2500 may comprise only the top attenuation coating 2510, whereby no side attenuation coating is applied to the second air-permeable body 2400.

Figure 8A:
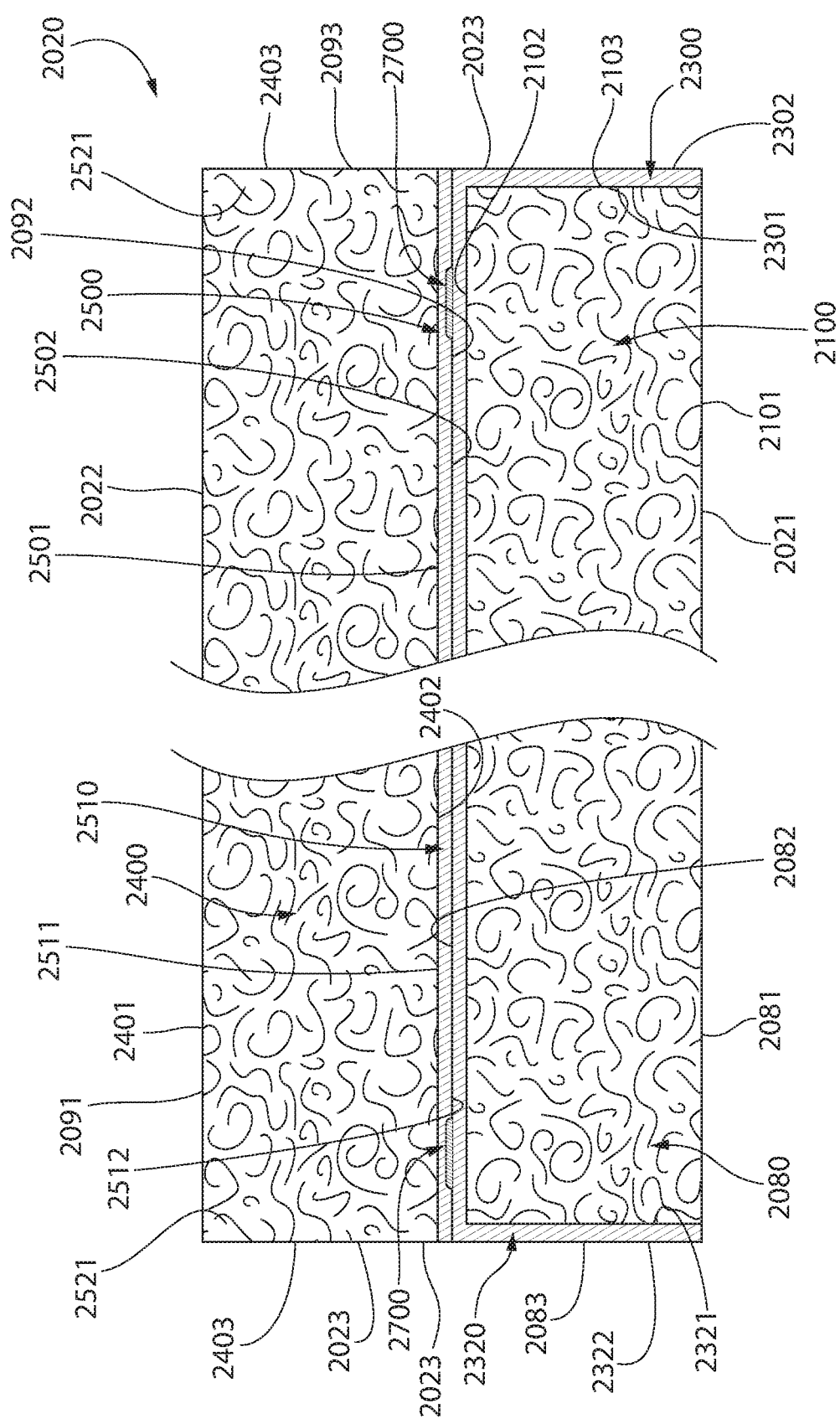
FIG. 8A is a cross-sectional view of the acoustic building panel along line III-III of FIG. 1 according to another embodiment.

Referring now to FIG. 8A, the second attenuation coating 2500 may comprise only the top attenuation coating 2510 and no side attenuation coating 2520, the side surface 2093 of the second coated body 2090 may comprise the side surface 2403 of the second air-permeable body 2400. Stated otherwise, the second coated body 2090 may be substantially free of the second attenuation coating 2500 on the side surface 2403 of the second body 2400. According to such embodiments, the side exposed surface 2023 of the building panel 2020 may comprise both the first attenuation coating 2300—specifically, the outer surface 2322 of the side attenuation coating 2320 as well as the second air-permeable body 2400—specifically, the side surface 2403 of the second air-permeable body 2400.

What is claimed is:

1. An acoustic ceiling panel having a first major exposed surface opposite a second major exposed surface, the acoustic ceiling panel comprising:
   a first layer having an upper surface opposite a lower surface, the first layer comprising:
      a first body comprising a first major surface opposite a second major surface and a side surface extending between the first and second major surfaces; and
      a first coating applied to the second major surface and the side surface of the first body while leaving the first major surface of the first body exposed so that the first major surface of the first body forms the first major exposed surface of the acoustic ceiling panel;
   a second layer having an upper surface opposite a lower surface, the second layer comprising:
      a second body comprising a first major surface opposite a second major surface and a side surface extending between the first and second major surfaces; and
      a second coating applied to the first major surface of the second body.

2. The acoustic ceiling panel according to claim 1, wherein the first coating is present on the second major surface of the first body in an amount ranging from about 10 g/ft$^2$ to about 45 g/ft$^2$.

3. The acoustic ceiling panel according to claim 1, wherein the first coating is present on the side surface of the first body in an amount ranging from about 10 g/ft$^2$ to about 45 g/ft$^2$.

4. The acoustic ceiling panel according to claim 1, wherein the second coating is present on the first major surface of the second body in an amount ranging from about 10 g/ft$^2$ to about 40 g/ft$^2$.

5. The acoustic ceiling panel according to claim 1, wherein the second coating is present on the side surface of the second body in an amount ranging from about 10 g/ft$^2$ to about 40 g/ft$^2$.

6. The acoustic ceiling panel according to claim 1, wherein the upper surface of the first layer comprises the first coating and the lower surface of the first layer comprises the first body.

7. The acoustic ceiling panel according to claim 1, wherein the second layer comprises a side surface extending between the upper surface and the lower surface of the second layer, and wherein the second coating is not applied onto the side surface of the second body so that the side surface of the second body forms the side surface of the second layer.

8. The acoustic ceiling panel according to claim 1, wherein the upper surface of the second layer comprises the second body and the lower surface of the second layer comprises the second coating.

9. An acoustic ceiling panel having a first major exposed surface opposite a second major exposed surface, the acoustic ceiling panel comprising:
- a first layer having an upper surface opposite a lower surface, the lower surface forming the first major exposed surface of the acoustic ceiling panel, the first layer comprising:
  - a first body comprising a first major surface opposite a second major surface and a side surface extending between the first and second major surfaces, the first body being air-permeable; and
  - a first attenuation coating applied to the second major surface and the side surface of the first body while leaving the first major surface of the first body exposed, the first major surface of the first body forming the lower surface of the first layer;
- a second layer having an upper surface opposite a lower surface, the second layer comprising:
  - a second body comprising a first major surface opposite a second major surface and a side surface extending between the first and second major surfaces, the second body being air-permeable, the second major surface of the second body facing the second major surface of the first body; and
  - a second attenuation coating applied to the second body; and
- an adhesive between the first and second layers.

10. The acoustic ceiling panel according to claim 9, wherein the adhesive is present in an interface formed between the upper surface of the first layer and the lower surface of the second layer.

11. The acoustic ceiling panel according to claim 10, wherein the first attenuation coating on the second major surface of the first body forms the upper surface of the first layer, and wherein the second major exposed surface of the acoustic ceiling panel is formed by the upper surface of the second layer.

12. The acoustic ceiling panel according to claim 10, wherein the first attenuation coating forms the upper surface of the first layer, wherein the second attenuation coating is applied to the second major surface of the second body so that the second attenuation coating forms the lower surface of the second layer, the first and second attenuation coatings being in contact at the interface between the upper surface of the first layer and the lower surface of the second layer, wherein the second major exposed surface of the acoustic ceiling panel comprises the upper surface of the second layer, and wherein the upper surface of the second layer is formed by the first major surface of the second body.

13. The acoustic ceiling panel according to claim 9, wherein the second attenuation coating is applied to the second major surface of the second body while leaving the first major surface and the side surface of the second body exposed so that the first major surface of the second body forms the upper surface of the second layer, wherein the first and second layers are positioned so that the first attenuation coating on the second major surface of the first body interfaces with the second attenuation coating on the second major surface of the second body, and wherein the first major surface of the first body forms the first major exposed surface of the acoustic ceiling panel and the first major surface of the second body forms the second major exposed surface of the acoustic ceiling panel.

14. The acoustic ceiling panel according to claim 9, wherein the second attenuation coating is not applied onto the first major surface of the second body so that the first major surface of the second body forms the second major exposed surface of the acoustic ceiling panel.

15. The acoustic ceiling panel according to claim 9, wherein the adhesive is present in an amount ranging from about 4.0 g/ft$^2$ to about 7.0 g/ft$^2$.

16. An acoustic ceiling panel having a first major exposed surface opposite a second major exposed surface and an exposed side surface extending between the first and second major exposed surfaces, the acoustic ceiling panel comprising:
- a first layer having an upper surface opposite a lower surface, the first layer comprising:
  - a first body comprising a first major surface opposite a second major surface and a side surface extending between the first and second major surfaces; and
  - a first coating applied to the second major surface and the side surface of the first body;
- a second layer having an upper surface opposite a lower surface, the second layer comprising:
  - a second body comprising a first major surface opposite a second major surface and a side surface extending between the first and second major surfaces; and
  - a second coating applied to the second major surface of the second body while leaving the first major surface and the side surface of the second body exposed, the second major surface of the second body facing the second major surface of the first body;
- wherein a first portion of the exposed side surface of the acoustic ceiling panel is formed by the first coating on the side surface of the first body and a second portion of the exposed side surface of the acoustic ceiling panel is formed by the side surface of the second body.

17. The acoustic ceiling panel according to claim 16, further comprising an adhesive between the first layer and the second layer, wherein the adhesive is in contact with the first coating of the first layer and the second coating of the second layer.

18. The acoustic ceiling panel according to claim 16, wherein the second layer is substantially free of the second coating on the side surface and the first major surface of the second body, and wherein the first layer is substantially free of the first coating on the first major surface of the first body.

19. A ceiling system comprising:
- a ceiling grid comprising a plurality of first members and a plurality of second members, the first and second members intersecting one another to define a plurality of grid openings;
- a plenary space above the ceiling grid;
- a room environment below the ceiling grid; and
- the acoustical ceiling panel according to claim 16 mounted to the ceiling grid and positioned within one of the plurality of grid openings;
- wherein the first major surface of the first body faces the room environment.

20. The ceiling system according to claim 19 wherein the first major surface of the first body is not coated with the first coating such that the first major exposed surface of the acoustic ceiling panel is formed by the first major surface of the first body and wherein the first major surface of the second body is not coated with the second coating such that the second major exposed surface of the acoustic ceiling panel is formed by the first major surface of the second body.

* * * * *